(12) United States Patent
Beveridge et al.

(10) Patent No.: US 10,291,721 B2
(45) Date of Patent: May 14, 2019

(54) REMOTE DOCUMENT SIGNING

(71) Applicant: VMware, Inc., Palo Alto, CA (US)

(72) Inventors: Daniel James Beveridge, Apollo Beach, FL (US); Blake Watts, Palo Alto, CA (US); Jian Mu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 437 days.

(21) Appl. No.: 14/986,549

(22) Filed: Dec. 31, 2015

(65) Prior Publication Data

US 2016/0344819 A1 Nov. 24, 2016

Related U.S. Application Data

(63) Continuation-in-part of application No. 14/686,769, filed on Apr. 14, 2015, which is a continuation of application No. 13/217,484, filed on Aug. 25, 2011, now Pat. No. 9,009,219.

(60) Provisional application No. 62/211,736, filed on Aug. 29, 2015, provisional application No. 62/211,850, filed on Aug. 30, 2015, provisional application No. 61/508,404, filed on Jul. 15, 2011.

(51) Int. Cl.
| | |
|---|---|
| *H04L 29/08* | (2006.01) |
| *G06F 9/451* | (2018.01) |
| *G06F 9/44* | (2018.01) |
| *G06F 3/0484* | (2013.01) |
| *H04W 4/00* | (2018.01) |

(52) U.S. Cl.
CPC ........ *H04L 67/142* (2013.01); *G06F 3/04842* (2013.01); *G06F 3/04847* (2013.01); *G06F 9/4445* (2013.01); *G06F 9/452* (2018.02); *H04L 67/025* (2013.01); *H04L 67/08* (2013.01); *H04L 67/1095* (2013.01); *H04L 67/16* (2013.01); *H04L 67/36* (2013.01); *H04W 4/00* (2013.01)

(58) Field of Classification Search
CPC .......................... G06F 9/4445; H04L 67/1095
See application file for complete search history.

(56) References Cited

U.S. PATENT DOCUMENTS

| | | | | |
|---|---|---|---|---|
| 8,700,905 B2 * | 4/2014 | Guenther | ................ | G06F 21/32 713/179 |
| 8,738,922 B2 * | 5/2014 | Guenther | ................ | G06F 21/32 713/182 |
| 2004/0176070 A1 * | 9/2004 | Lai | ........................ | G06F 21/606 455/411 |
| 2005/0188306 A1 * | 8/2005 | Mackenzie | ....... | G06F 17/30011 715/268 |
| 2006/0036940 A1 * | 2/2006 | Hsiu-Ping | ......... | G06F 17/30905 715/249 |

(Continued)

*Primary Examiner* — Lashonda T Jacobs

(57) ABSTRACT

Documents or other files opened on a remote desktop are mirrored onto a mobile client device that allows a user to seamlessly work on such documents or files in either a stationary or mobile fashion. The mirrored files may be presented to the user on the mobile client device with the capacity for the user to sign his or her name—or otherwise mark—the mirrored document on the client device. Once signed, various techniques are executed that cause the signed version of the mirrored files to be communicated back to the remote desktop where the signed files are saved. Such techniques may operate transparent to a user, eliminating the need for the user to constantly have to save and transport signed files between multiple devices when working on the go.

20 Claims, 17 Drawing Sheets

(56) References Cited

U.S. PATENT DOCUMENTS

| | | | | |
|---|---|---|---|---|
| 2010/0128291 A1* | 5/2010 | Vendrow | G06F 21/64 | 358/1.9 |
| 2010/0306406 A1* | 12/2010 | Mathur | H04L 67/38 | 709/234 |
| 2011/0004680 A1* | 1/2011 | Ryman | H04L 67/025 | 709/224 |
| 2011/0179289 A1* | 7/2011 | Guenther | G06F 21/32 | 713/189 |
| 2011/0185184 A1* | 7/2011 | Guenther | G06F 21/32 | 713/182 |
| 2011/0209064 A1* | 8/2011 | Jorgensen | G06F 9/54 | 715/733 |
| 2012/0086971 A1* | 4/2012 | Bisbee | H04L 9/321 | 358/1.14 |
| 2012/0284591 A1* | 11/2012 | Seed | G06Q 20/3274 | 715/201 |
| 2012/0303962 A1* | 11/2012 | Ghani | G06F 17/243 | 713/176 |
| 2013/0007224 A1* | 1/2013 | Yang | H04L 67/08 | 709/219 |
| 2013/0019156 A1* | 1/2013 | Gonser | G06Q 50/18 | 715/221 |
| 2013/0219184 A1* | 8/2013 | Amaya Calvo | H04L 9/3236 | 713/176 |
| 2017/0208133 A1* | 7/2017 | Jorgensen | G06F 9/54 | |

\* cited by examiner

REMOTE DOCUMENT SIGNING

CLAIM OF PRIORITY

This application claims the benefit of U.S. Provisional Patent Application Ser. No. 62/211,736, entitled "Mobile Devices in Service of Desktop Uses" filed on Aug. 29, 2015, and U.S. Provisional Patent Application Ser. No. 62/211,850, entitled "Mobile Devices in Service of Desktop Uses" filed on Aug. 30, 2015. Both of these provisional applications are incorporated herein by reference in their entirety for all intents and purposes. Further, this application is a continuation-in-part to U.S. patent application Ser. No. 14/686,769 entitled "Native Viewer Use for Service Results from a Remote Desktop" filed on Apr. 14, 2015. which is a continuation of U.S. patent application Ser. No. 13/217,484 entitled "Native Viewer Use for Service Results from a Remote Desktop" filed on Aug. 25, 2011, now U.S. Pat. No. 9,009,219, which claims the benefit of U.S. Provisional Patent Application No. 61/508,404 entitled "Native Viewer Use for Service Results from a Remote Desktop" filed on Jul. 15, 2011.

BACKGROUND

Virtual desktops allow users to access and work off of their desktop computers remotely from other computing devices. For example, workers from home can log in to a cloud-based service and the work off of their work computer desktops as if they were in their office. To virtualize a desktop computer, a server-side program runs a "virtualized desktop" that accesses user interfaces, applications, files, and other software on the desktop computer. The virtualized desktop then makes this remotely accessed software available to other devices with the appropriate authentication credentials (e.g., username, password, token value, etc.). Users may authenticate themselves to the virtualized desktop to gain access to the desktop computer's software.

Conventional authentication mechanisms—like entering a username and password—are somewhat cumbersome and often are not worth the effort for rather menial uses of the remote desktop. For instance, users who may just want to view a document on the remote desktop while the user is away in a meeting may not wish to go through a complicated log-in process to the access the document, opting instead to wait until the user leaves the meeting and returns to the desktop. Or if the user does not have access to a virtualized desktop, the user may have to store the document on a portable piece of memory, such as a flash drive, that can be read by another computing device. Either way, the user experience is somewhat frustrated, dissuading users from interacting with the desktop-stored document unless the need to do so exceeds the extra steps of the virtual authentication process or use of the portable memory.

SUMMARY

The disclosed examples are described in detail below with reference to the accompanying drawing figures listed below. The below Summary is provided to illustrate some examples disclosed herein, and is not meant to necessarily limit all examples to any particular configuration or sequence of operations.

Some embodiments are directed to remotely signing documents on a client device. A session is established to allow the client device to remotely access the remote desktop to have a document opened on the remote desktop mirrored onto the client device. The remote desktop is polled for queued mirror commands related to the document opened on the remote desktop. The remote document on the remote desktop is retrieved and mirrored on the client device. A user signature on the mirrored version of the document on the client device is received. The signed mirrored version is then transmitted from the client device to the remote desktop and saved on the remote desktop.

Other embodiments are directed to computer-storage memory embodied with instruction executable by a processor to enable remote signature of documents on a client device. The instructions are executable for: causing a client device to poll a remote desktop for one or more mirror commands instructive to cause a document opened on the remote desktop to be mirrored on the client device; providing signature capability on the client device to allow a signature to be captured on the mirrored document; capturing a user signature on the client device; creating a signed version of the mirrored document that includes the captured user signature; and transmitting the signed version of the mirrored document to the remote desktop.

Still other embodiments are directed to a client device with computer-storage memory embodied with computer-executable instructions for mirroring a document opened on a remote desktop; a display device; and a processor. The processor is specifically programmed to: poll the remote desktop for mirroring commands instructive for causing the document opened on the remote desktop to be mirrored on the display device, capture a user signature on the display device, create a signed version of the mirrored document that includes the captured user signature, and transmit the signed version of the mirrored document to the remote desktop.

BRIEF DESCRIPTION OF THE DRAWINGS

Corresponding reference characters indicate corresponding parts throughout the drawings.

DETAILED DESCRIPTION

Figure 1:
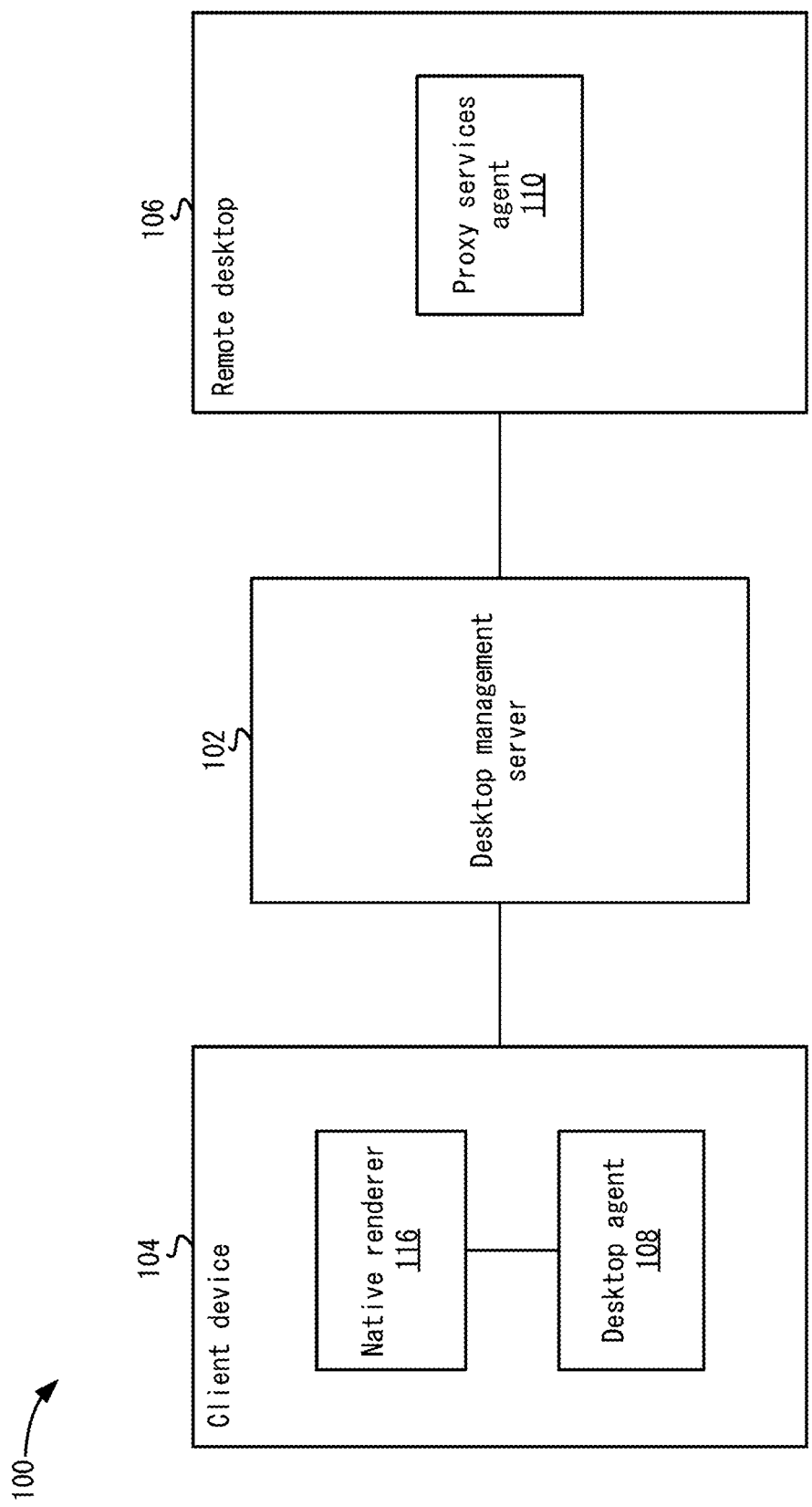
FIG. 1 depicts a system for providing desktop services.

The proliferation of mobile computing devices has, in many ways, extended the user experience from desktop and laptop computers (collectively referred to herein as "desktops" or "desktop computers") to more easily transportable devices, such as smart phones, computer tablets, smart watches or glasses, and other mobile devices (collectively referred to herein as "mobile devices"). Many software programs that were once solely used on desktops are accessible on numerous mobile devices, providing users the freedom to work either at a desk or on the go. But switching between a desktop and mobile device is not without user friction. Users cannot just work on a desktop and then pick up their mobile device and continue working without some additional steps. For instance, the user may need to first save a document on a removable drive, plug the removable drive into the mobile device, and then open the saved document from the removable drive on the mobile device. Or the user may need to log into a particular program from the mobile device to continue working on a project or view a specific program opened on the desktop. These additional steps often deter the user from using their mobile devices to continue the user experience of the desktop.

Embodiments discussed herein are generally directed to enhancing and extending the user desktop experience using mobile devices that seamlessly integrate with a desktop in a user-frictionless manner, and provide additional extended authentication and electronic signature capabilities to the desktop. Embodiments provide features that allow a user to sign any mirrored document opened on the desktop on the mobile device. The signed document may then be easily attached as part of a form message (e.g., template e-mail, text message, instant message, etc.) that is automatically created on the desktop or mobile device for the user to send. The aforesaid embodiments are referred to below as "Document Signing."

The touch screen and direct finger interactions possible with mobile devices are helpful for a range of user-application interactions. Perhaps none is so natural than the ability to sign a document with one's finger without any more hassle than picking up a pen and signing a physical paper. Desktops typically lack such touch screen capability. So users who may have a tablet sitting next to them will often be forced to print out a PDF, physically sign the printed PDF, and scan the signed PDF back to the desktop before proceeding to the next document action. Such a process is cumbersome, and oftentimes in a busy office, the printer and scanner are located in another physical area and being shared with multiple users vying to use them or queuing documents to be printed. The document-signing embodiments discussed herein alleviate this user frustration by offering a low-friction alternative.

In an embodiment, a user can sign any mirrored document on the mobile device anywhere the user chooses. For purposes of this disclosure, a "mirrored document" refers to a document that may be received, stored, or opened on a remote desktop computer with a copy that is transmitted to and opened on a client device. For example, some of the embodiments disclosed herein enable the document that is stored in the hard drive of a personal computer to be copied and opened on a mobile tablet. The user of the mobile tablet, having access to the mirrored document, may then sign the document (e.g., using a stylus, finger, pointer, etc.) on the mobile tablet. Once signed, a signed version of the document may be transmitted, either upon direction of the user or automatically (e.g., after a certain period of time, back the personal computer for storage thereon. Alternatively, a signed, mirrored document on a client device may be saved by the user and quickly messaged to other users or devices using a messaging application, such as e-mail, instant messaging, text messaging, picture messaging, voicemail (upon translation of the document into audio), Web publishing, social media (e.g., Twitter, Facebook, or the like), or any other messaging application. For example, a mirrored PDF document may be signed with a user's finger on the mobile device, and the signed PDF may be stored and/or attached to an outgoing e-mail message, thereby eliminating the need for the user to print, sign, and scan the PDF. Thus, a mirrored document may be copied twice by the various embodiments herein: first from the remote computer to a client device in unsigned form, and second in signed form from the client device back to the remote computer. In this manner, the document may be considered "mirrored" both ways.

The signed mirrored document may be added to the form message either automatically upon capturing of a signature or at the click of a button by the user. In another embodiment, the signed document may be mirrored back to the desktop, which may, upon receipt of the signed document, save the mirrored signed document in a particular folder, add the mirrored signed document to a form message of a particular messaging application, send the mirrored signed document to a particular web site (e.g., blog, social media, Intranet, etc.), or perform other preset actions. The ability to generate a source document in an application; have it appear instantly on the mobile device ready for signing; and then, with one touch, have the signed document attached inside an already crafted e-mail ready for minor tweaks greatly enhances user productivity and cuts out precious time spent scanning, copying, or creating messages.

One particular embodiment enables a user to sign documents on a mobile tablet, smart phone, or wearable device (e.g., smart watch). Upon signing, some embodiments automatically store the electronically signed document on a remote desktop device without the user having to save the document or otherwise transport the signed document to the desktop. Additionally or alternatively, options may be provided to the user on the mobile device that allow the user to quickly and efficiently generate and send an e-mail with the signed document attached from the remote desktop using the mobile device. For example, a user may sign a document on a smart phone using a finger and select an option on the smart phone to add the signed document to a form e-mail and the automatically generated form e-mail with attached signed document to a given user. Consequently, in some embodiments, the document signed on the smart phone is stored on the remote desktop and attached to an e-mail that is sent from the remote desktop. This effectively provides the user with the ability to operate their remote desktop to sign, save, and send documents from a mobile device, thereby freeing the user to leverage the capabilities of a nearby mobile device while, at the same time, keeping the power of the remote desktop at the user's fingertips.

One particular example communicates a document, image, or video to a smart watch, either directly or through a paired mobile device (e.g., smart phone or mobile tablet). To do so, some embodiments use the paired mobile device (e.g., smart phone or tablet) to capture the communicated document, image, or video in the manner discussed below and then transmits the captured document, image, or video from the mobile device to the smart watch for display. The smart watch may then display the document, image, or video and capture a user's signature thereon. In such embodiments, the mobile device (e.g., an iPhone) works with a smart watch (e.g., an APPLE WATCH®) and relays the document, image, or video on the desktop for exporting to the smart watch for display thereon. Alternatively, the smart watch itself may act as the mobile device and retrieve the communicated document, image, or video from the desktop directly, without using a paired mobile device as an intermediary. Both implementations are fully contemplated by the various embodiments discussed herein.

Having described various embodiments of this disclosure, attention is directed to the architecture and individual devices configured to perform the remote document signing capabilities previously discussed. Looking at the accompanying figures, FIG. 1 depicts an exemplary system 100 for providing desktop services. Users may use a mobile device, which is shown and referred to as client device 104, to interact with a desktop management server 102 to access services provided by a user's remote desktop 106. Client device 104 may use a client services interface to have services performed by remote desktop 106. The client services interface may be part of a remote desktop solution allowing access to remote desktop 106.

Client device 104 may send service requests to remote desktop 106. As will be described below, proxy services agent 110 may provide multiple services. Proxy services agent 110 processes the request by having the service performed by remote desktop 106. A result set is generated by remote desktop 106 and proxy services agent 110 sends the result set to client device 104. A native viewer (not shown) on client device 104 may be invoked and used to display the result set. Thus, instead of using a remote desktop protocol to display an image of the user's remote desktop 106, the native viewer is used to display the result set, which in some examples includes a file corresponding to the document. With client devices 104 having a different form factor than a user's desktop, the user may leverage certain features, such as touch-screen navigation and smooth scrolling provided by the native application that are available on client device 104, but may not be available by remote desktop 106.

Remote desktop 106 may be a physical computer system or a virtualized computer system. Physical desktops may be actual physical machines being controlled remotely. Virtualized desktops may export user interfaces, e.g., keyboard and mouse input, audio and visual output, to the user from virtual machines running remotely (in the datacenter) or locally on client device 104, or, in some cases, using a hybrid.

Desktop management server 102 may be an interface layer that includes desktop management software with various functions. Desktop management server 102 (see FIG. 7) includes a connection broker 723, which allows a remote user to select a type of remote desktop (e.g., remote desktop client or client services interface) and initiate a desktop session, or a connection to remote desktop 106 using client device 104. Client device 104 may be a mobile device, such as a cellular phone, smart phone, tablet, personal computer (PC), laptop or other computing device that may have a different form factor than a remote desktop. For example, remote desktop 106 may virtualize a screen size that is different from the size of the display provided by access device 104. Additionally, client device 104 may be running a different operating system (OS) with different application characteristics and application programming interfaces (APIs) than remote desktop 106. Client device 104 includes a desktop agent 108 that communicates with desktop management server 102. Desktop agent 108 may send service requests to have services performed by the user's remote desktop 106. The agent 108 may also receive image information (e.g., framebuffer data) of the remote desktop 106, causing the image information to be displayed on the client device 104. In an embodiment, a side channel for a remote desktop session may be used to send the requests and receive the result sets. This side channel may be used instead of a channel used to send an image of remote desktop 106 using a display protocol. Desktop management server 102 allows non-display traffic to be sent from desktop agent 108 to remote desktop 106 in the side channel. This process is described in more detail below.

The service queries include file explorer services, web proxy services, and search services, all of which will be described in more detail below. Other services may also be performed. In an embodiment, proxy services agent 110 may only process service requests from client device 104. Other requests, such as remote desktop protocol requests, for the desktop may be processed by other agents in desktop management server 102.

Proxy services agent 110 outputs a result set. The result set may be representative of what would be output on an image of remote desktop 106. For example, the result set may include a list of files that can be displayed by client device 104. Any suitable protocol or API can be implemented for message transmission between client device 104 and desktop management server 102. For example, various web services protocols can be used, and the message payloads may be encrypted and/or compressed. Desktop agent 108 uses a native renderer 116 to display the result set. Desktop agent 108 and native render 116 may be integrated into a single application (or "app") that is installed onto the device. Native renderer 116 selects a native viewer and launches the native viewer to display the result set. The native viewer may be a component of the system software shipped with device 104, an add-on application or plug-in, or integrated with desktop agent 108 and/or native renderer 116. Depending on the type of information in the result set, different native viewers may be used. In one example, native viewers are used to display documents of different file formats, such as PDF, PPT, XLS, and DOCx. The native viewer may be optimized for the screen size of client device 104, and includes features available to client device 104 that may not be available on remote desktop 106. For example, different views, options, and navigation ability (e.g., zoom-in, pan, and rotate features, touch screen, etc.) may be provided for locally viewed result sets. For example, a native file explorer application may be used to display a list of files.

To illuminate various aspects of the disclosed embodiments for remote document signing, some of the accompanying drawings are discussed out of order. FIGS. 8-17 detail various embodiments configured to perform remote document signing and are discussed next. FIGS. 2-7 illustrate general environments and techniques for virtualizing a desktop computer and are discussed after FIGS. 8-17.

Figure 8:
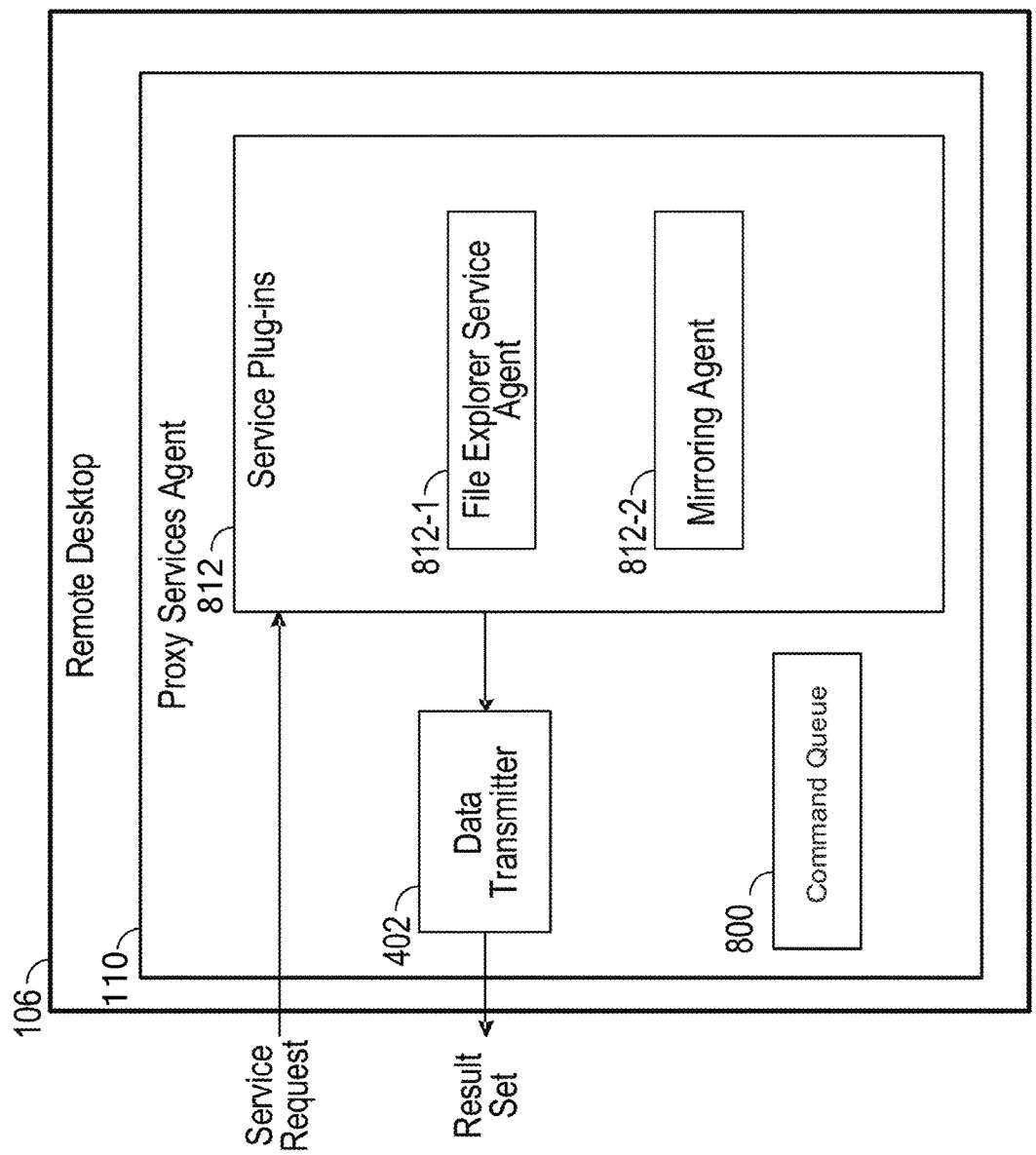
FIG. 8 depicts a more detailed example of a proxy services agent.
Figure 9:
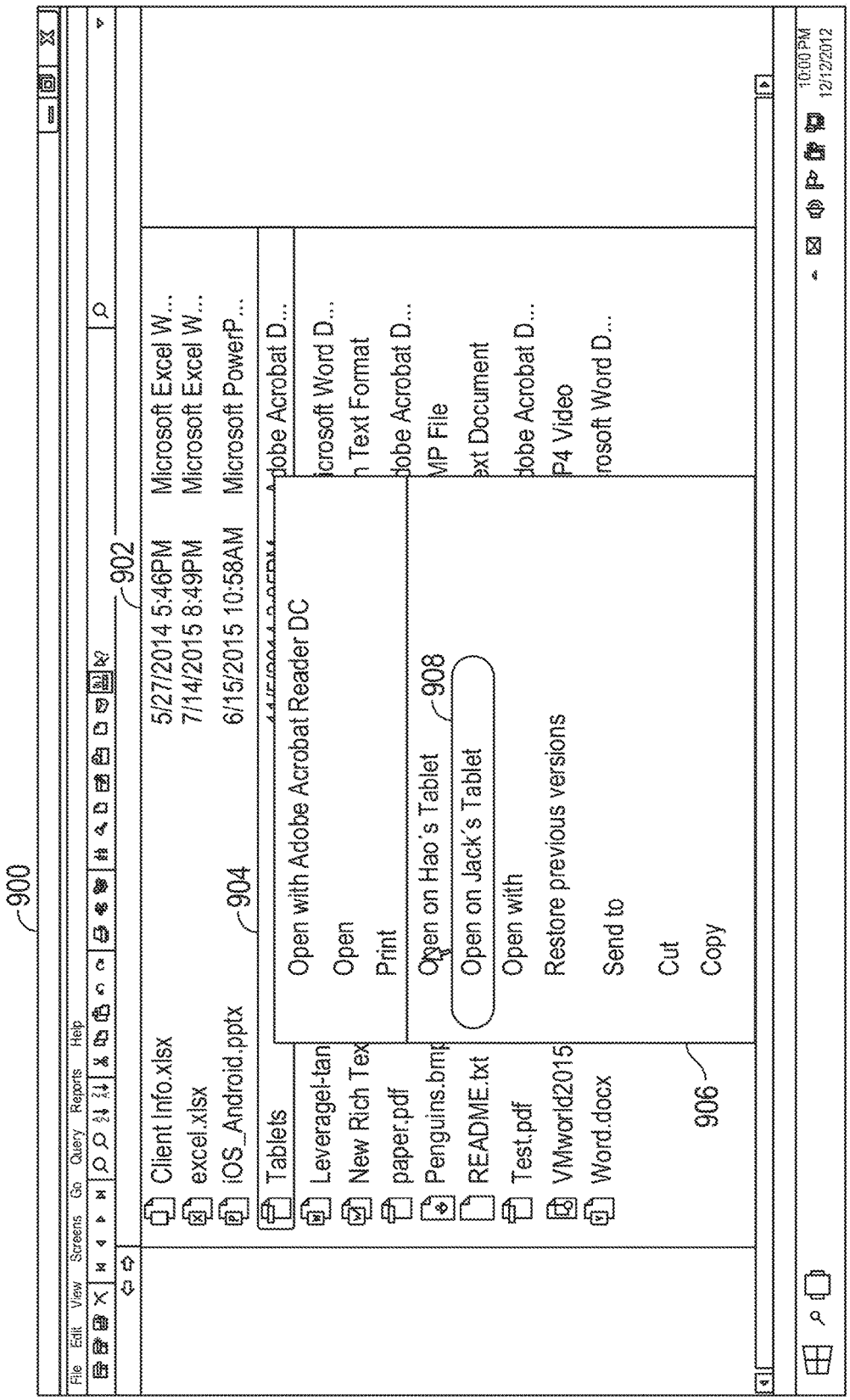
FIGS. 9-13 illustrate various UIs of different remote use techniques disclosed herein.

FIG. 8 depicts a detailed example of proxy services agent 110. As described above, a service request may be received from a client device 104. Proxy services agent 110 includes service plug-ins 812 including a file explorer service agent 812-1 and a mirroring agent 812-2 to process different service requests. The proxy services agent 110 also includes a command queue 800 that stores various instructions for document signing and message generation for documents signed on the client device 104. Additional or alternative plug-ins may be used in various embodiments. Embodiments discussed below reference the client device 104 opening and signing documents stored on the remote desktop 106, as well as preparing and sending messages that include attached versions of the so-signed documents.

In an embodiment, file explorer service agent 812-1 performs requests associated with the files stored on or accessible to remote desktop 106, and specifically retrieves file images or pointers thereto associated with documents and software being mirrored between the remote desktop 106 and the client device 104. Mirroring agent 812-2 detects when particular documents to be mirrored have been opened and generates mirroring instructions (discussed below) for storage in the command queue upon opening the documents—e.g., during a double-click or file+open command pathway.

Proxy services agent 110 receives service requests for mirroring specific documents opened on the remote desktop 106, and initiating message (e.g., e-mail, text, etc.) on the remote desktop 106 with signed versions of mirrored documents. Proxy services agent 110 performs the requested services, optionally, by performing system calls to the operating system running on remote desktop 106. For example, the remote desktop 106 screen may be locked or unlocked by accessing system functions of the operating system on remote desktop 106. Also, applications running on remote desktop 106 may also be queried to perform the services. A result set including a document to be mirrored (e.g., a document selected by a user for mirroring or otherwise set for mirroring) may be gathered by proxy service agent 110 and then returned to client device 104. In one embodiment, proxy services agent 110 uses file explorer service agent 812-1 to output the document to be mirrored, images of the document to be mirrored, or pointers to locations where the document is stored (e.g., either on the remote document 106 or on another computing device, such as a server).

In an embodiment, proxy services agent 110 includes a command queue 800 for storing commands for document mirroring. Command queue 800 may store any kind of data. In addition to the other commands and instructions mentioned herein, command queue 800 store instructions related for application delivery. For document mirroring, in an embodiment, the opening of a document on the remote desktop causes the mirroring agent 812-2 to create and queue a mirroring command in the command queue 800. In an embodiment, the mirroring command includes an instruction to mirror a document and one or more pointers to the opened file. The desktop agent 108 of the client device 104 may be configured to periodically poll the remote desktop 106 for commands in the command queue 800, and the remote desktop 106 exposes the commands in the command queue 800 in response. Upon receipt of the instruction to mirror the opened file on the remote desktop 106, the desktop agent 108 of the client device 104 may then request the location of the opened document.

The file explorer service agent 812-1 may either provide the pointer location to the opened file, thereby allowing the desktop agent 108 of the client device 104 to retrieve and display the mirrored opened file on the client device 104, or alternatively, the file explorer service agent 812-1 may pull and provide document to the desktop agent 108 of the client device 104 as a result set transmitted via the data transmitter 402. The document may be retrieved, in an embodiment, by either the desktop agent 108 or the file explorer service agent 812-1 using a Web Distributed Authoring and Versioning (WebDAV) protocol. The desktop agent 108 of the client device 104 displays the document on the client device 104, and a user of the client device 104 may sign the document with a finger, stylus, or using some other user interface.

Document mirroring may occur both ways between the client device 104 and the remote desktop 106, such that changes made to the opened document on the client device 104 are stored and reflected in the document on the remote desktop 106—without the user having to transfer and save the modified document between devices. In such an embodiment, the file explorer agent 112-1 is bi-directional, meaning that it can both retrieve the opened document and update the opened document with changes made on the client device. For example, signatures on the document made on a mobile tablet may be stored either with original file of the document (e.g., as a new saved version) or as a completely new edited file of the document.

In an embodiment, the desktop agent 108 is configured to allow a user to sign mirrored documents on the client device 104. The desktop agent 108 tracks and marks mirrored documents according to user or stylus touches on a touch screen of the client device 104. For example, a PDF document may be mirrored on the client device 104, and a user may sign the mirrored document using the touch screen. The client device 104 may be configured to automatically—or upon user command—transmit a signed document to the remote desktop 106, and the messaging service agent 812-6 may create form messages (e.g., e-mail, SMS, MMS, instant message, etc.) with the signed document attached. For example, a user may view on the client device 104 a mirrored copy of a memorandum prepared for a client that is stored on the remote desktop 106. The user may sign the mirrored document, resulting in the newly modified mirrored document being sent back to the remote desktop 106 and attached to a template e-mail message. Alternatively, the messaging service agent 812-6 may reside on the client device 104, creating the form message thereon upon signing of the mirrored document directly on the client device 104.

FIGS. 9-13 illustrate various UIs of different remote use techniques disclosed herein. Looking at FIG. 9, a UI screen 900 on the remote desktop 106 is shown providing options 902 for a user to select one or more registered client devices 104 (e.g., a mobile tablet such as an iPad Mini or an iPad Air) for mirroring a selected PDF (iPadPro.pdf) document. The depicted UI 900 shows the user electing option 904 to display the selected PDF on a mobile tablet, and the user then selects in a secondary UI of options 906 and option 908 to select one mobile tablet to receive the mirrored document. In an embodiment, the user may prospectively set the client device 104 to receive all mirrored documents, a select group of mirrored documents (e.g., types of documents, documents from a particular user, etc.), documents opened during a particular session, or a combination thereof. Alternative embodiments automatically mirror documents being opened to preselected client devices 104. Additionally, while reference is made to documents being opened and digitally signed, other files, such as images, videos, audio, or the like, on a remote desktop 106 may also be presented to a user on a client device 104 and signed or otherwise acknowledged.

Figure 10:
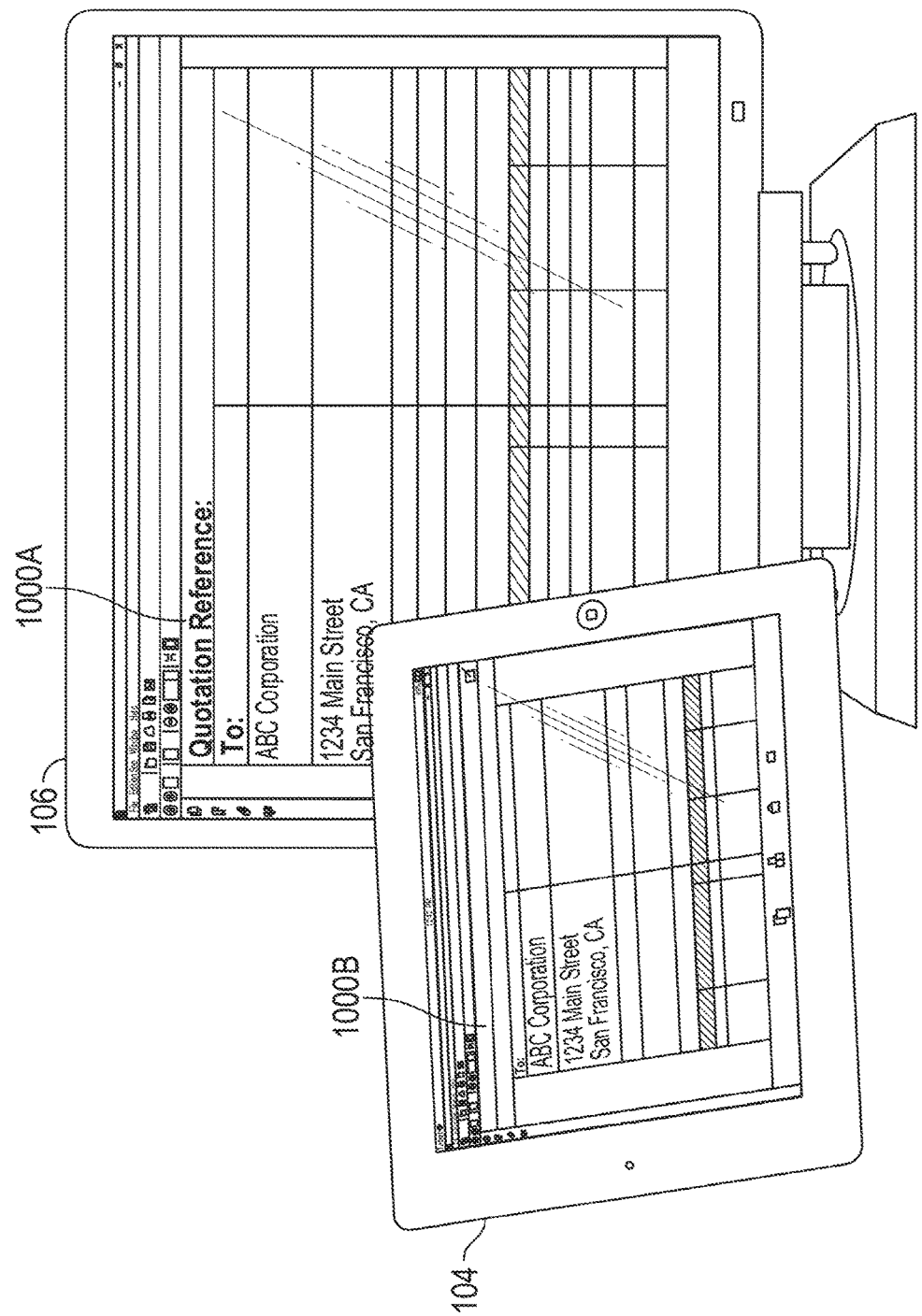

FIG. 10 illustrates a document opened on a remote desktop 106 (a personal computer) being mirrored on a client device 104 (a mobile tablet). The document is represented by a PDF shown as 1000A on the remote desktop 106 and 1000B on the client device 104. More specifically, the illustrated example shows a document that was opened, saved, or received by the remote desktop 106 and that, using some embodiments, has been automatically communicated to the client device 104 without user interaction and presented to the user for signing.

Figure 11:
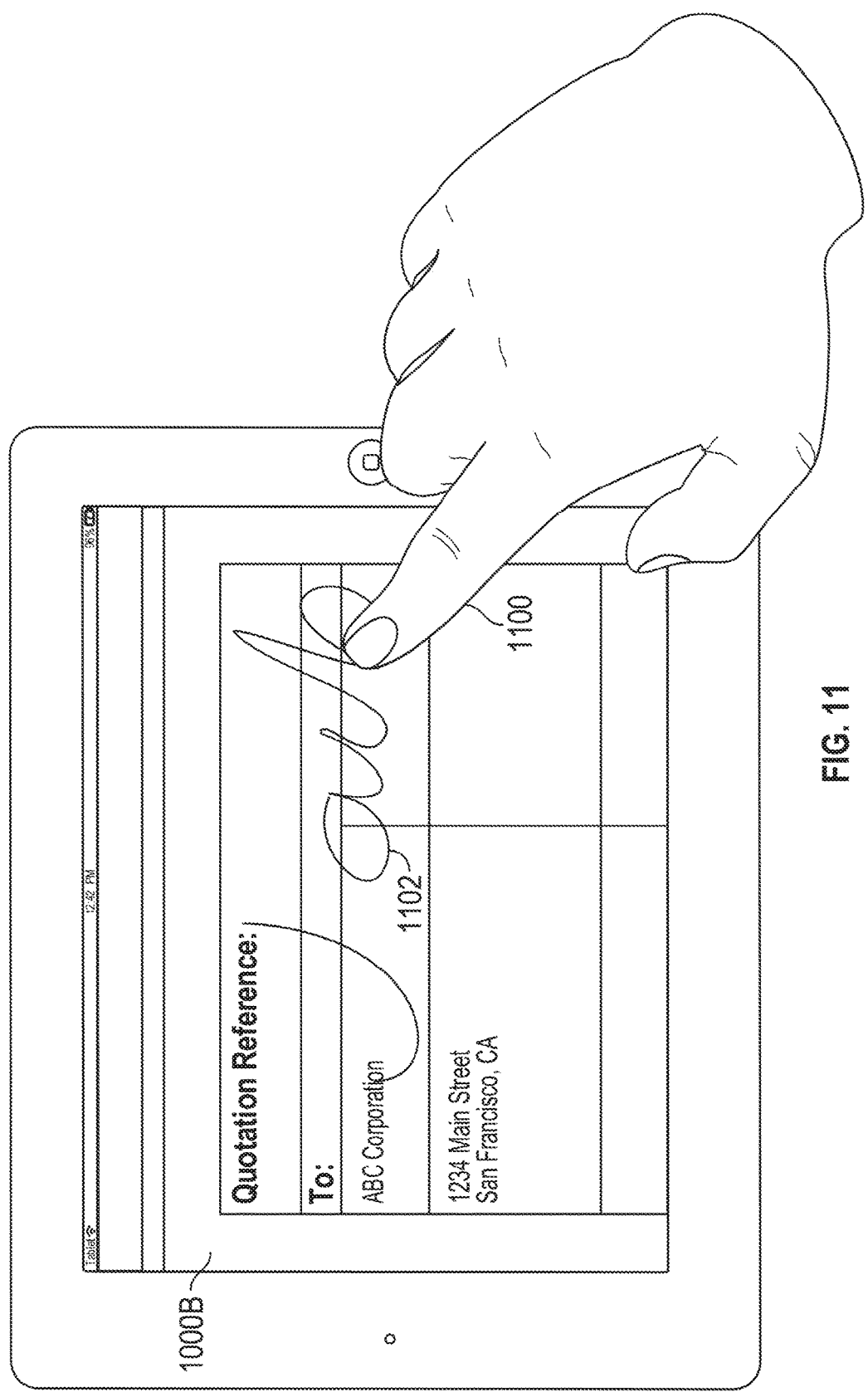

FIG. 11 illustrates a user's finger 1100 signing a mirrored PDF 1000B on a client device 104. Using some of the disclosed embodiments, the user can sign the document using the touch screen of the client device 104, and transmit, from the client device 104, a signed version of the document with the user's signature 1102 back to the remote desktop 104 for storage thereon or communication (e.g., e-mail) therefrom.

Figure 12:
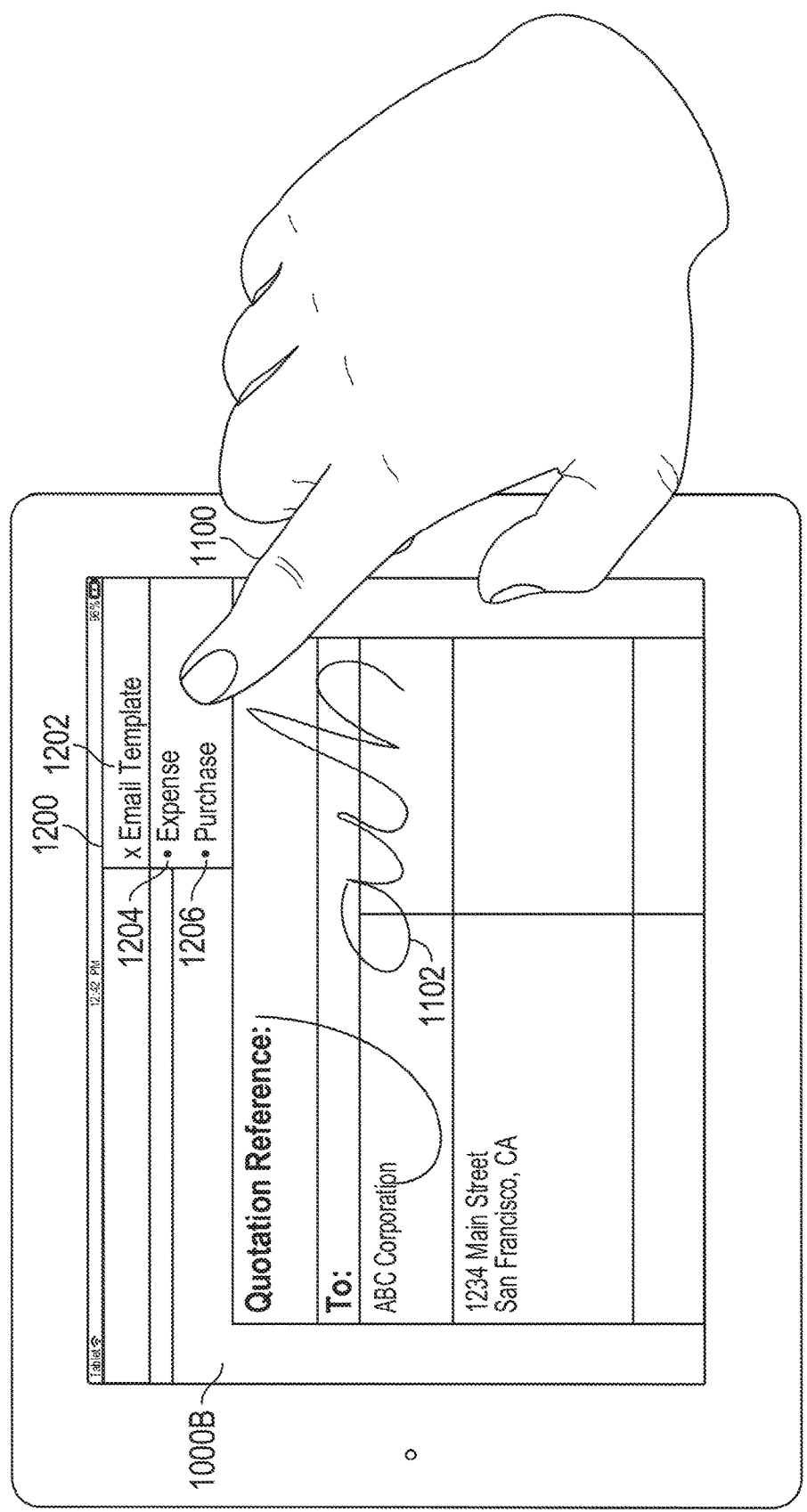
Figure 13:
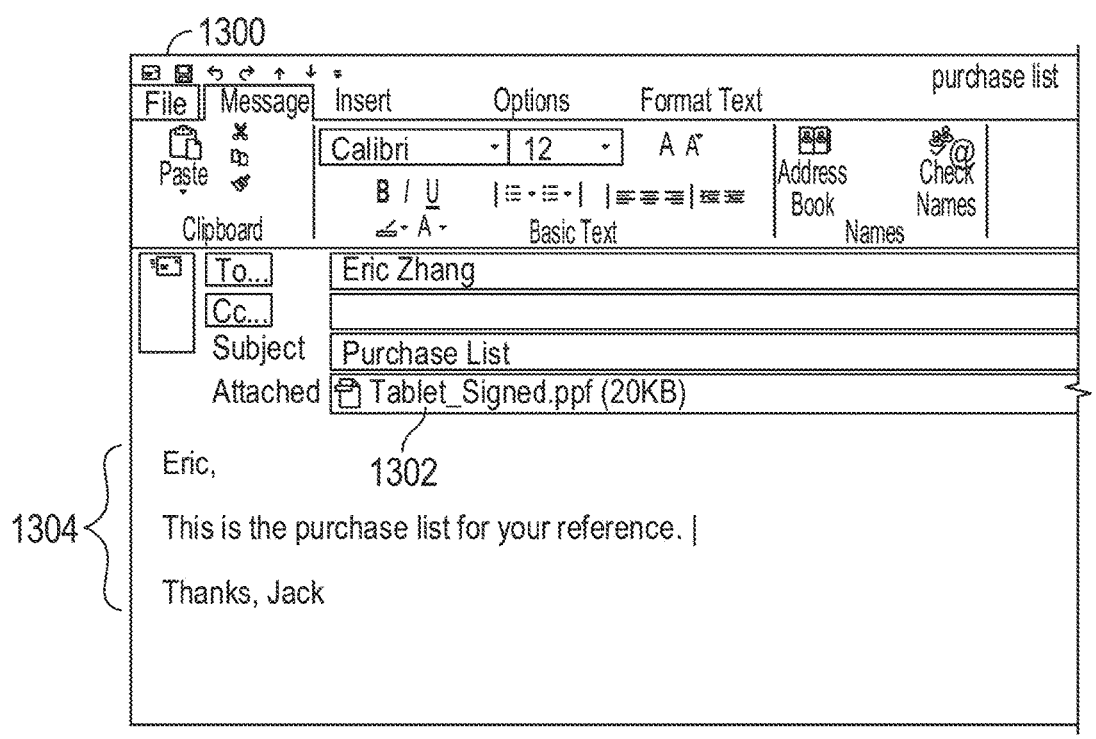

FIG. 12 illustrates a UI of messaging options 1200 for communicating the signed document 1000B with the user's signature 1102 back to the remote desktop 106. Messaging options 1200 provide the user options for attaching signed document 1000B to preset template messages 1200 (e.g., e-mails). Sample template messages 1200 are shown as "Expenses" messages 1204 and "Purchase" messages 1206 that, when selected, attach signed document 1000B to an e-mail form template text and/or recipients. For example, as shown in FIG. 13, a user electing to include signed document 1000B in a Purchase message may, in some embodiments, cause the client device 104 to send the signed document 1000B to the remote desktop 106 and the trigger the remote desktop to: (1) save a copy of the signed document 1000B, and (2) create and send a preset e-mail template message 1300 with the signed document 1000B attached (1302) and preset text 1304 to a given recipient. This allows users to remotely sign and send documents from client devices 104 in a single step while also saving the signed documents to their desktop—all without having to manually transport documents between the two devices (e.g., using a memory stick, through e-mail to oneself, etc.).

Figure 14:
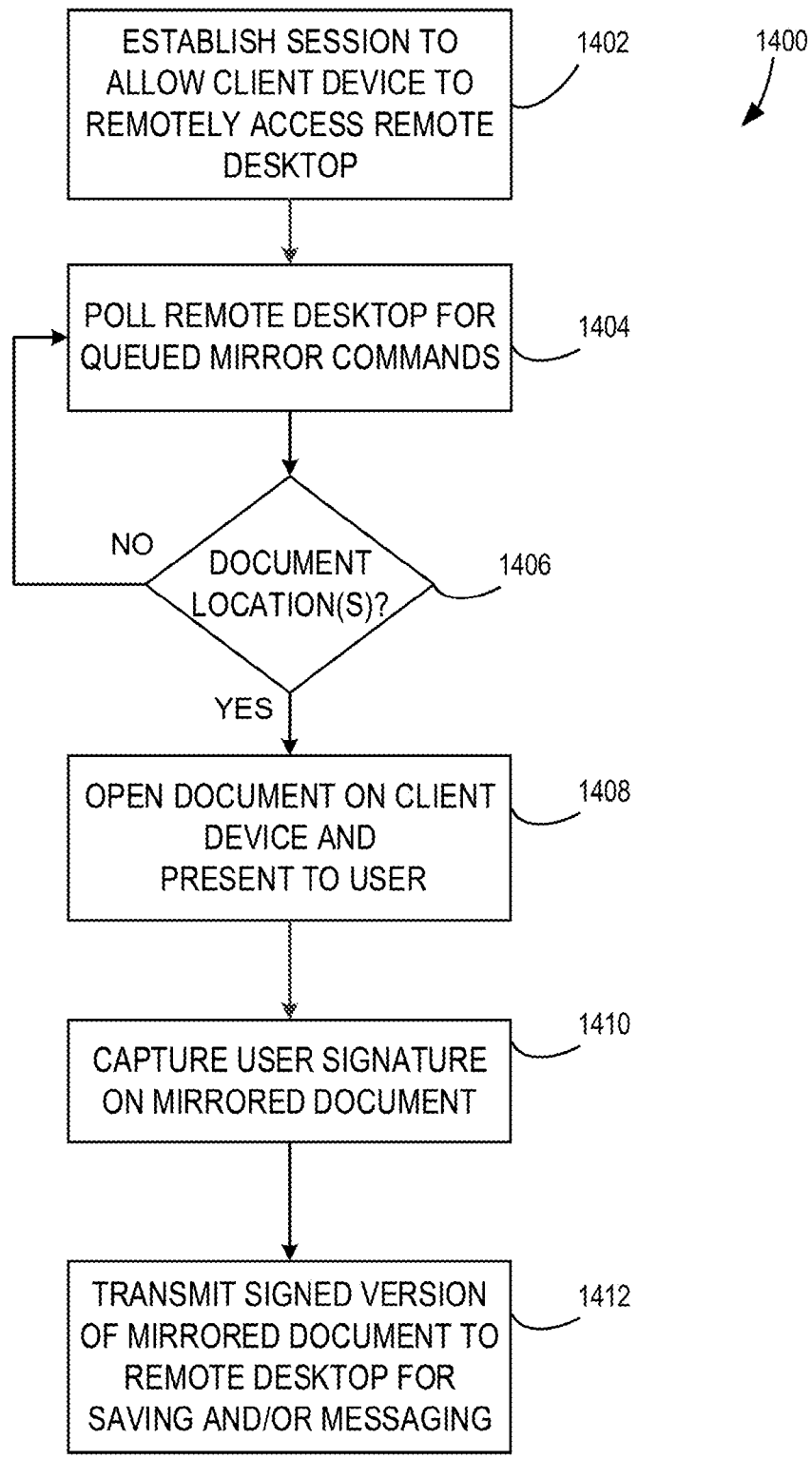
FIGS. 14-15 are flow chart diagrams illustrating work flows for signing documents on a client device.
Figure 15:
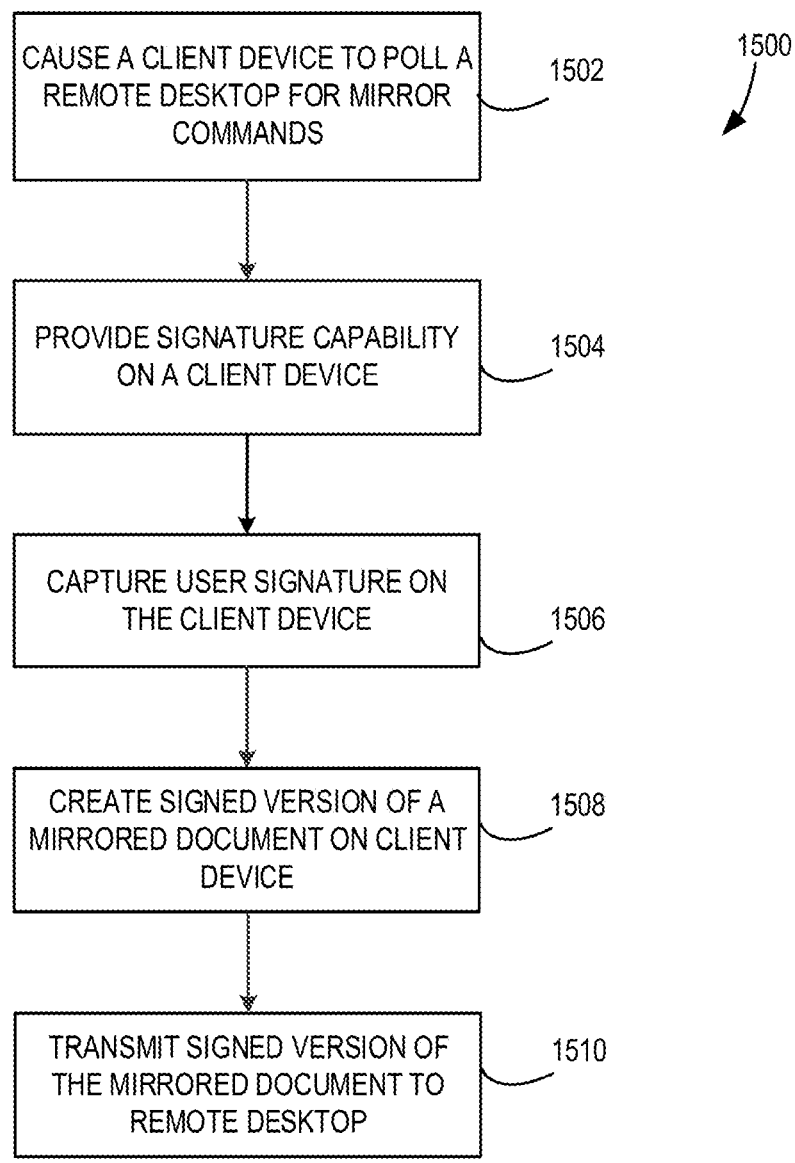

FIGS. 14 and 15 are example flow chart diagrams illustrating work flows 1400 and 1500 for signing documents on a client device 104.

Looking initially at work flow 1400, a session is established between a remote desktop 106 and a client device 104, as shown at block 1402. For example, a user may leave the remote desktop 106 and carry a mobile tablet (client device 104) on the user's way to a meeting. Picking up the mobile tablet may cause a mirroring session to begin between the two devices. During the session, the client device polls the remote desktop 106 for queued mirror commands, as shown at block 1404. A document, image, video, or other file (collectively referred to throughout work flows 1400 and 1500 as the "document") that is opened or received by the remote desktop 106 is queued by the remote desktop 106 for mirroring to the client device 104 using the various components disclosed herein. The client device 104 checks for document locations of the to-be-mirrored document, as shown by decision block 1406.

When the locations of documents are queued by the remote desktop 106, the client device 104 uses the locations to retrieve the document for mirroring and opens the retrieved document on the client device 104 to the user, as shown at block 1408. The client device 104 provides the ability to capture the user's signature on the mirrored document (e.g., through a touch screen, a peripheral, etc.), as shown at block 1410. Once signed, the signed version of the mirrored document is communicated back to the remote desktop 106, where the signed version is saved and/or added to a template message (e.g., e-mail, text, etc.), as shown at block 1412.

Turning to work flow 1500, a client device 104 is configured to poll a remote desktop for one or more mirror commands instructive to cause a document opened on the remote desktop to be mirrored on the client device, as shown at block 1502. Signature capability is provided on the client device to allow a signature to be captured on the mirrored document, as shown at block 1504. A user's signature is captured on a touch screen of the client device, as shown at block 1506, and a signed version of the mirrored document is created that includes the user's signature, as shown at block 1508. Once the signed document is created, it may be transmitted (as shown at block 1510) or attached to a message, as discussed above.

Figure 16:
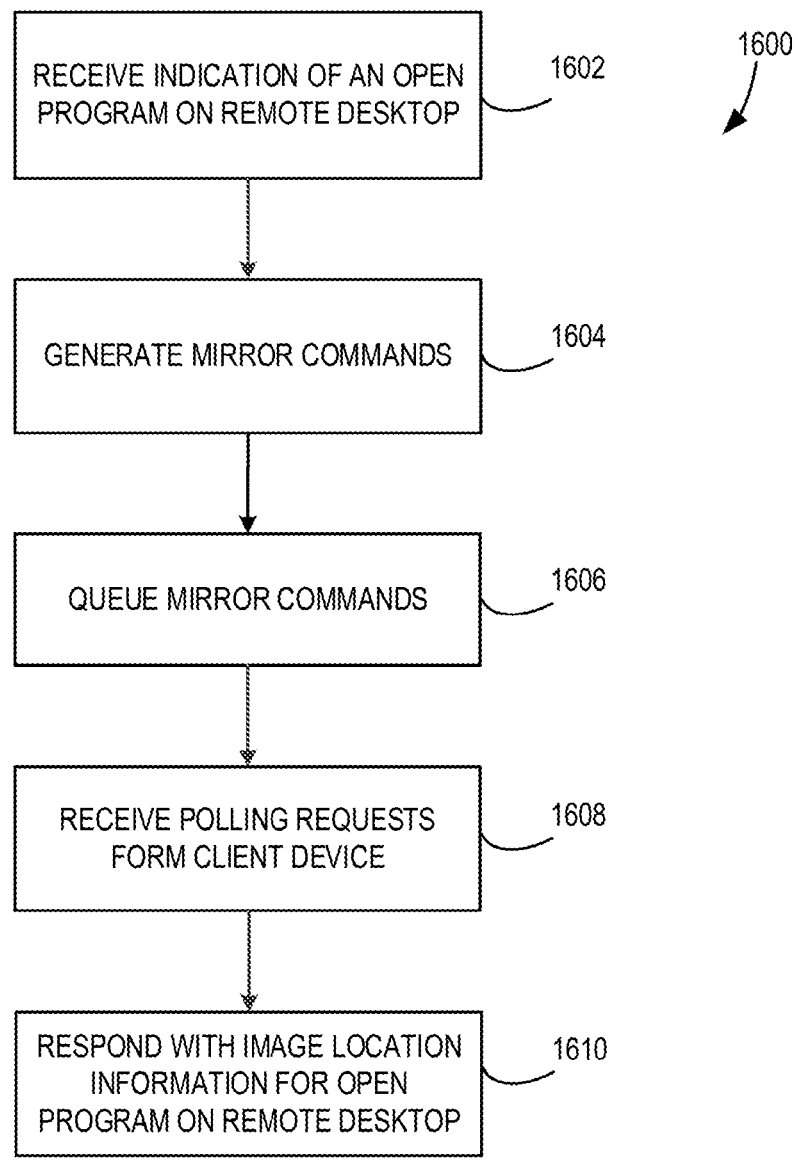
FIG. 16 is an example flow chart diagram illustrating a work flow for mirroring an open and user-selected program on a remote desktop.

FIG. 16 is an example flow chart diagram illustrating a work flow 1600 for mirroring an open and user-selected program on a remote desktop. An indication of an open program on a remote desktop to be mirrored to a client device is received, at shown at block 1602. Mirror commands are generated and queued, as shown at blocks 1604 and 1606, respectively. Polling requests from the client device are received, as shown at block 1608. In response to the polling requests, locations of the opened program on the remote desktop are provided to the client device, as shown at block 1610. The documents can then be retrieved by the client device 104 and displayed to mirror the open program.

Additional Embodiments

Some embodiments are directed to remotely signing documents on a client device. A session is established to allow the client device to remotely access the remote desktop to have a document opened on the remote desktop mirrored onto the client device. The remote desktop is polled for queued mirror commands related to the document opened on the remote desktop. Using the queued mirror commands, the document is opened on the remote desktop are retrieved and used to create a mirrored version, on the client device, of the document opened on the remote desktop. A user signature on the mirrored version of the document on the client device is received. The signed mirrored version is then transmitted from the client device to the remote desktop and saved on the remote desktop.

Other embodiments are directed to computer-storage memory embodied with instruction executable by a processor to enable remote signature of documents on a client device. The instructions are executable for: causing a client device to poll a remote desktop for one or more mirror commands instructive to cause a document opened on the remote desktop to be mirrored on the client device; providing signature capability on the client device to allow a signature to be captured on the mirrored document; capturing a user signature on the client device; creating a signed version of the mirrored document that includes the captured user signature; and transmitting the signed version of the mirrored document to the remote desktop.

Still other embodiments are directed to a client device with computer-storage memory embodied with computer-executable instructions for mirroring a document opened on a remote desktop; a display device; and a processor. The processor is specifically programmed to: poll the remote desktop for mirroring commands instructive for causing the document opened on the remote desktop to be mirrored on the display device, capture a user signature on the display device, create a signed version of the mirrored document that includes the captured user signature, and transmit the signed version of the mirrored document to the remote desktop.

In some embodiments, the client device automatically communicates the signed version of the document to the remote desktop upon user signature.

Additional or alternative embodiments may also perform or include any combination of the following:
- transmitting the signed version of the document from the client device to the remote desktop;
- generating a template message on the remote desktop with the signed version of the document attached.
- transmitting a template message with the signed version of the document attached from the remote desktop to a recipient messaging address without user interaction;
- wherein the client device is a mobile tablet or a smart phone;
- wherein the client device is a smart watch or a wearable device;
- presenting on the client device one or more options for generating template messages on the remote desktop that include the signed version of the document;
- receiving a user selection one of the one or more options;
- signaling the remote desktop to send a message with the signed version of the document attached;

In some embodiments, a system includes a desktop agent that cooperates with a mobile agent to provide a range of augmented services to desktop users, allowing the mobile device to function as an extension of the desktop for designated tasks. In some embodiments, the multiple helper devices are registered simultaneously to the desktop for purposes of serving as augmentations to user productivity or enhancements to user experience. In some embodiments, a user can authenticate to a remote desktop session using the touch-ID capability of a mobile device such as an APPLE IPAD® or IPHONE®, or wearable watch. In some embodiments, a user may lock or unlock the desktop's screen using Touch-ID.

In some embodiments, documents launched on the desktop are automatically mirrored to a mobile device for viewing on that device. In some embodiments, documents can be directly launched on a mobile device from the desktop using the format 'Open Document on Device' where 'Device' is the name of a target mobile device.

In some embodiments, specific document types are designated for automatic mirroring on specific target device allowing direct routing of documents launched on the desktop to target devices based on document type.

In some embodiments, a document launched on the desktop may be mirrored directly to multiple devices simultaneously.

In some embodiments, a mirror document may be signed using a finger or stylus on the touch screen device for a resulting PDF containing the resulting document with applied signature. In some embodiments, the signed document is saved back directly to a designated folder in the desktop's file system with the original file name plus an appended suffix such as "_signed."

In some embodiments, the signed document is sent to a desktop email program for attachment into an email.

In some embodiments, the signed document may be generated from a designated email template such as a MICROSOFT OUTLOOK® Template which results in a preformatted email with the signed document attached.

In some embodiments, a designated application window is mirrored to a mobile device such that a selected area of the desktop is visible on a designated mobile device for the purposes of viewing a discreet portion of the source desktop.

An embodiment is directed to a method comprising a helper application running on a remote device connecting to a remote desktop for the purpose of enhancing the desktop user's productivity by augmentation of workflow elements for tasks initiated on the desktop, continued on the mobile device, and completed on the desktop.

In some embodiments, document signing is initiated on the desktop by launching a document, continued on a mobile device by signing on a touch screen, and completed on the desktop by saving the signed document or emailing same.

In some embodiments, a portion of the desktop screen is exported to a mobile device for discreet viewing, when the desktop screen is locked or unlocked.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the operations. The various embodiments described herein may also be practiced with other computer system configurations including hand-held devices, microprocessor systems, microprocessor-based or programmable consumer electronics, minicomputers, mainframe computers, and the like.

The examples illustrated and described herein as well as examples not specifically described herein but within the scope of aspects of the disclosure constitute exemplary means for signing documents opened or stored on a desktop device remotely on a client device. For example, the elements illustrated in the figures, such as when encoded to perform the operations illustrated in the figures, constitute exemplary means for implementing the operations recited in the Claims and/or otherwise described herein.

One or more embodiments may be implemented as one or more computer programs or as one or more computer program modules embodied in one or more computer readable storage media. The term computer readable storage medium refers to any data storage device that can store data which can thereafter be input to a computer system—computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CDR, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some examples, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible, non-transitory, and are mutually exclusive to communication media. In some examples, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or other data in a modulated data signal such as a carrier wave or other transport mechanism, and include any information delivery media.

Although described in connection with an exemplary computing system environment, examples of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Examples of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Operating Architecture and Devices

Figure 2:
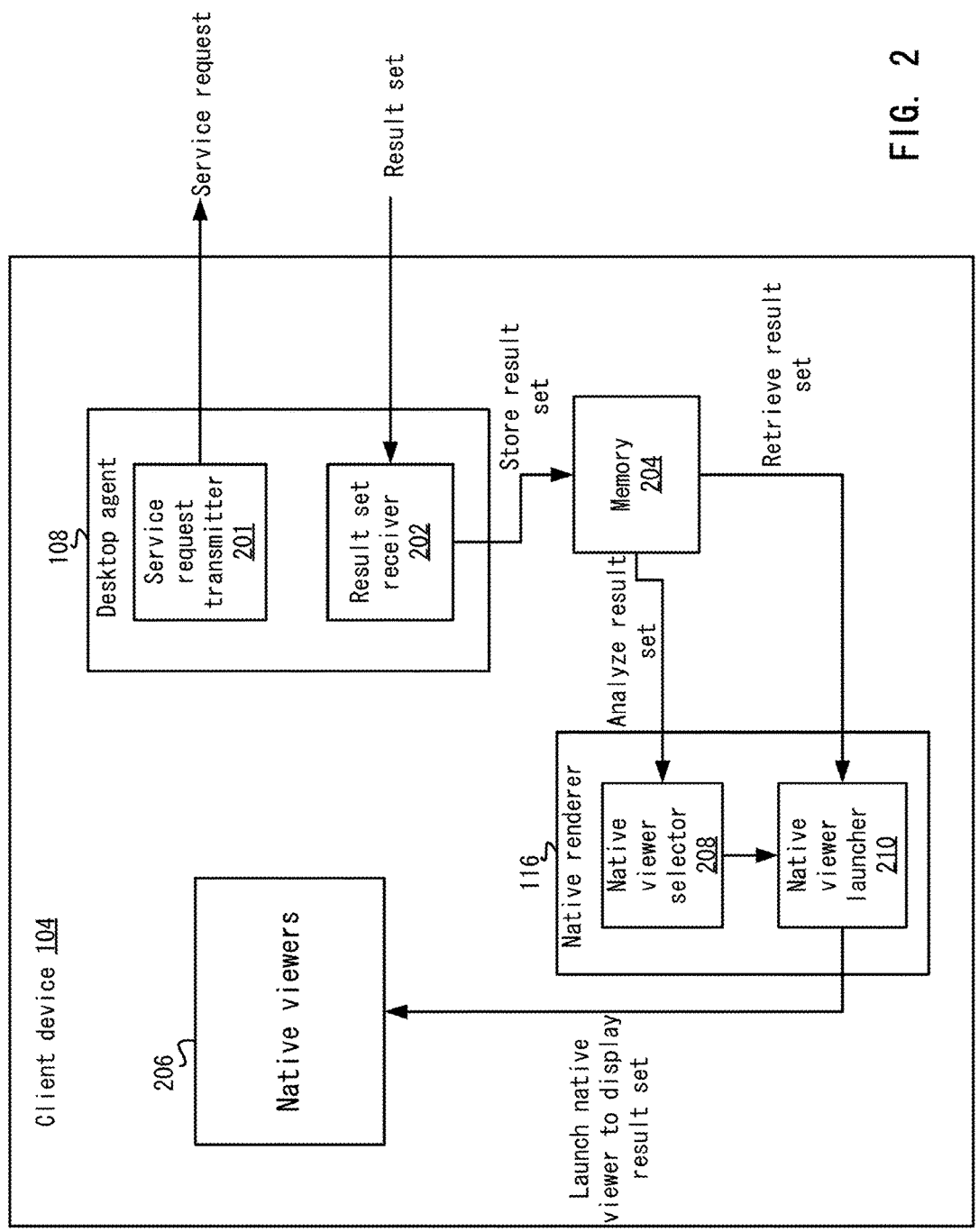
FIG. 2 depicts a more detailed example of a client device.

FIG. 2 depicts a more detailed example of client device 104. The user is authenticated before access to remote desktop 106 is allowed. Once authenticated, a service request transmitter 201 is used to send a service request to remote desktop 106. A result set receiver 202 of desktop agent 108 receives a result set from proxy services agent 110. The authentication process and processing of a service request at remote desktop 106 will be described in more detail below.

In an embodiment, a communication channel may be opened for displaying a remote bitmap representation of remote desktop 106. Various remote desktop protocols, such as RDP, VNC, or PCoIP, may be used to access remote desktop 106. Client device 104 receives over the communication channel display information using the display protocol, and displays a bitmap representation of the remote desktop. A side channel for the communication channel may be used to send service queries and receive result sets that operates inside the same network ports as the main display protocol communication but which logically segments 'side channel' data using a system of embedded content tagging. Desktop agent 108 may open ports on client device 104 that are used to connect to desktop management server 102 through the side channel. Accordingly, client device 104 is not required to communicate through the side channel for receiving the bitmap representation of remote desktop 106. Rather, an independent channel for sending service requests and receiving result sets may be used.

Depending on implementation, service request transmitter 201 and result set receiver 202 may be able to send and receive, respectively, communications in any suitable protocol either as an independent network channel or as a side channel to an established display protocol network channel. The protocols may be able to send metadata and result sets in text-based or binary formats. Additionally, the protocol may be used across different platforms, such as iOS™, Android™, WebOS™, and Blackberry. In an embodiment, JavaScript object notation (JSON) is used. JSON is a text-based format used for sending data over a network connection for web services. Other protocols may also be used. For example, Apache "Thrift" is an interface definition language that is used as a remote procedure call (RPC) framework. Apache Thrift is a binary communication protocol and provides object-level RPC abstractions using a binary wire protocol. "Google protobuf" may also be used for encoding of structured data in a binary format. In an embodiment, when files are selected by a user on client device 104 for retrieval, the above protocols may be used when the native application restricts a client view to a limited number of files per view and paging may be used where portions of files (e.g., pages) are downloaded at a time. Some of the protocols also allow compression of the files and also paging. For commonly used advanced formats like DOCx, PPTx and PDF where the file packaging format is open, the file can be downloaded in pages. In this case, the client services interface also needs to interface with the native viewer application in order to send pages on demand, e.g., when a user advances or scrolls beyond currently cached information.

The result set, upon being downloaded, may be stored in a memory 204, which may be local cache memory. Memory 204 (or the result set stored therein) may be encrypted and made accessible only after the user has been authenticated. Also, memory 204 may be protected from other applications on client device 104 when the user is not accessing remote desktop 106. For example, the data stored in memory 204 is not accessible by other applications other than via desktop agent 108. Known techniques for securing (e.g., encrypting) memory 204 may be used. Also, result sets stored in memory 204 may be persistent. For example, when client device 104 is offline, the result sets in memory may still be accessed. In an embodiment, memory 204 may be a fixed size. When memory 204 is of a fixed size, an eviction policy may be used to clear space in memory 204. Different methods to free up space in memory 204 are known in the art, such as a least recently used (LRU) policy. Also, although memory 204 is described as being a fixed size, memory 204 may be expandable via external memory devices.

In one example, when a service request is performed, memory 204 may be checked to determine if the result set already resides in memory 204. For example, when a file is requested, a "last modified date" time-stamp policy is used to determine if a file has been changed on remote desktop 106 before downloading the file again. If the file has not been changed, then the file may be retrieved from memory 204 and displayed.

After the result set is downloaded to memory 204, a native viewer 206 may be used to render the result set. Native viewers 206 are local to client device 104. That is, the applications, components, plugins, etc., comprising native viewers 206 are stored on client device 104 and are launched on client device 104. Typically, native viewers 206 are customized for the form factor of client device 104. In this case, native viewer 206 may have different features that leverage the form factor. For example, native viewers 206 may leverage touch screens and various touch commands. Also, native viewer 206 may have features that are not available on applications running on remote desktop 106. Additionally, the data may be displayed in a way that fits the form factor in client device 104. For example, mobile devices may have smaller screens and the data may be formatted in a way to optimize the viewing of the data.

A native viewer selector 208 is used to select the type of native viewer 206. Determining which native viewer 206 to use may be based on the type of data included in the result set. For example, metadata for the result set is used to determine which native viewer 106 to use. In one example, Multipurpose Internet Mail Extensions (MIME) types are used to determine the type of data and which native viewer 106 to use. For example, if a PDF file is being displayed, a local PDF "Intent" is launched. The "Intent" is a handler that can launch a local application for client device 104. In other examples, if a text document is being rendered, then a local word processing application is used to render the document. Most client devices 104 include built-in support for common file types, e.g., various MICROSOFT OFFICE® files, PDF files, JPG files, etc.

A native viewer launcher 210 launches the selected native viewer 206 to display the result set. In an embodiment, the display the user sees would be the same as if native viewer 206 was launched to display the result set without connecting to remote desktop 106. In other embodiments, a combination of a bitmap display and native viewer 206 may be used. For example, a first frame may include a bitmap representation of remote desktop 106 and a second frame may include a view of the result set (or a portion of the result set) in native viewer 206.

In some embodiments, a local native viewer 206 may not be available to render the result set. In this case, a third-party application may be used. The third-party application may include a cloud-based application where the application is installed and maintained on a server (e.g., a server in a data center that also includes remote desktop 106) that is accessible to client 104. In one example, native viewer launcher 210 opens an interface for the third-party application using a representational state transfer (REST) interface. Native viewer launcher 210 may connect to the server, such as an application publication server (e.g., such as a terminal server or similar technology), to download the result set and be provided with the user interface for edit/view functionality over a desktop remoting protocol. In this case, remote desktop 106 may send the result set to the server instead of client device 104. Also, using the third party application may be efficient when the file size is large and the user is only interested in a portion of the file. In an embodiment, when the server and virtual machine running remote desktop 106 are in the same data center, sending the result set to the server may be faster due to the bandwidth being higher in the data center than sending the result set to client device 104.

Figure 3:
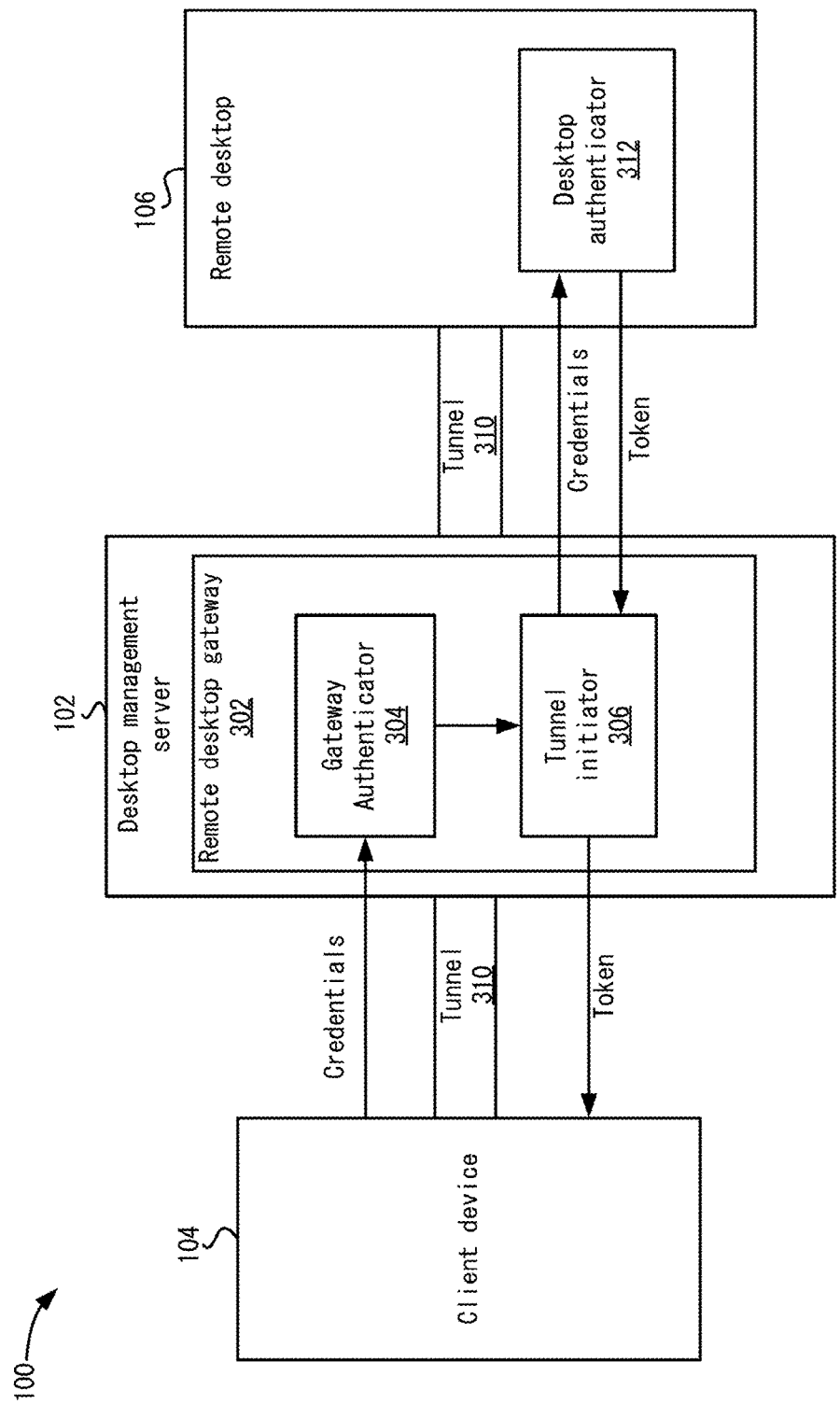
FIG. 3 shows a more detailed example of the system for authenticating the user.

The user may be authenticated before accessing remote desktop 106. FIG. 3 shows a more detailed example of system 100 for authenticating the user. A remote desktop gateway 302 is used to authenticate the user. Remote desktop gateway 302 may be deployed in a demilitarized zone (DMZ) in the data center and may be included in a connection broker 723 in FIG. 7, which is described below. In one example, a new client services interface (shown in FIG. 6) is launched by a user to have services performed. The client services interface may be similar to a remote desktop client in terms of establishing connectivity to remote desktop 106. Although the authentication is described with respect to establishing a remote desktop session, an independent authentication process may be used for establishing a session for having services performed. When the client services interface on client device 104 is launched, client device 104 provides credentials to remote desktop gateway 302. For example, enterprise credentials are provided to authenticate the access for the user to remote desktop 106. A gateway authenticator 304 authenticates the credentials. Gateway authenticator 304 may use different methods of authenticating the credentials. In one example, based on the administrative policy, the user may be asked to use a two-factor authentication. For example, the user may be required to first provide an RSA SecurID® or another token and then provides active directory credentials. This authentication process is known and need not be described further.

In an embodiment, in some cases where users are outside an enterprise network, once the user is authenticated, a tunnel initiator 306 determines a remote desktop 106 for the user. For example, a connection is initiated to a virtual machine running in the data center. The credentials are passed to the virtual machine. The virtual machine accessed could be the user's assigned virtual machine, or a generic virtual machine used just for mounting and accessing the user's virtual disk. This way, the user's virtual machine need not be running to access the user's data. A desktop authenticator 312 is used to authenticate the user and returns a token that can be used by client device 104 for communication with remote desktop 106. Tunnel initiator 306 then initiates a tunnel 310 between client device 104, gateway 302, and remote desktop 106. Tunnel 310 allows users from outside a firewall of the enterprise to access resources hosted in the enterprise (e.g., remote desktop 106). It may not be necessary to establish a tunnel for users inside the enterprise network.

In an embodiment, a remote desktop session is also initiated to allow an image of the user's desktop to be displayed. Display protocol information, such as PCoIP/RDP protocol display information, may be sent through tunnel 310. For example, Hypertext Transfer Protocol Secure (HTTPS) is used and the display information is encrypted using secure socket layer (SSL). Additionally, as discussed above, a side channel to the remote desktop session is used to send service requests and result sets through the tunnel. In an embodiment, client device 104 uses separate ports to have services performed than those used to send the display information.

Figure 4:
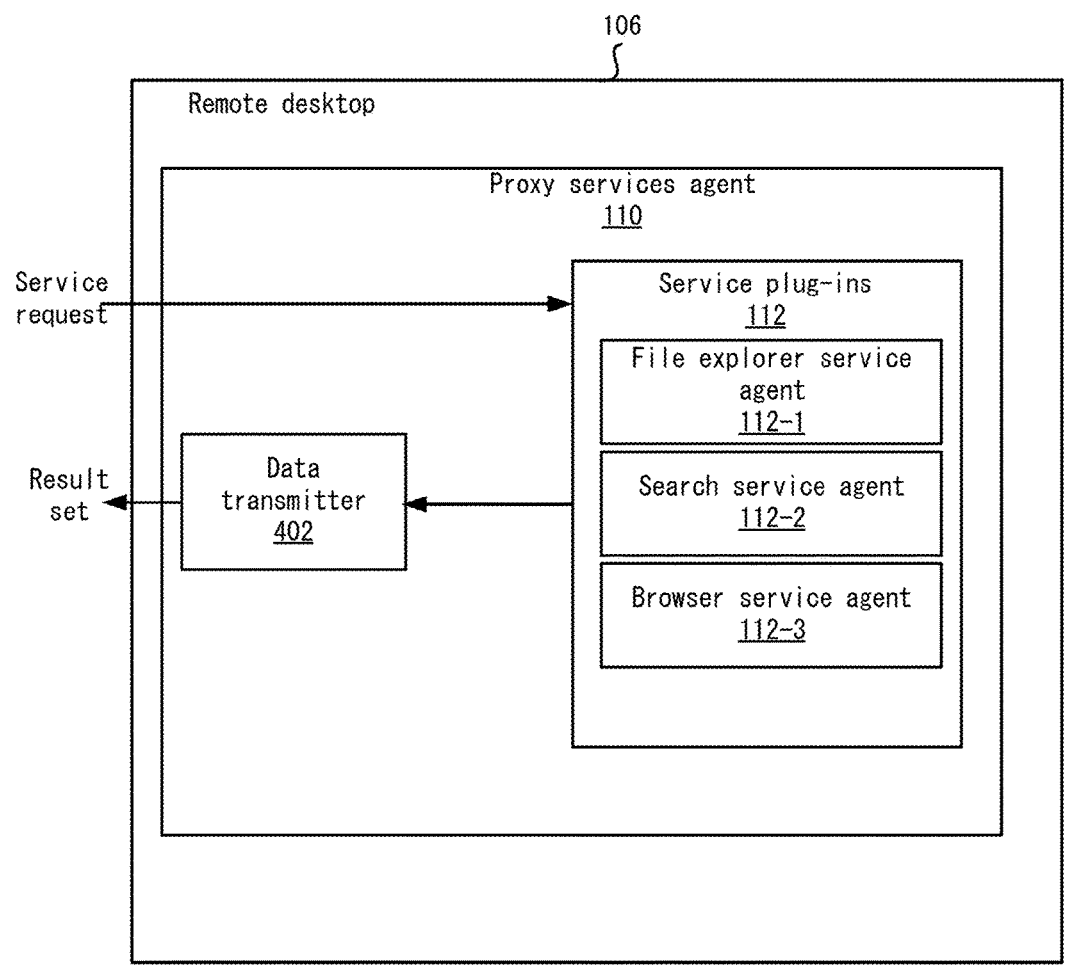
FIG. 4 depicts a more detailed example of a proxy services agent.

Once client device 104 is authenticated, client device 104 can send service requests through tunnel 310. If the user on the same network as remote desktop 106, then communication may flow directly from client device 104 to remote desktop 106 without mediation through remote desktop gateway 302. In one example, client 104 may be provided an initial client services interface that provides various options to interact with remote desktop 106. For example, different services may be performed, such as the file explorer service, the search service, or the browser service. Client device 104 can generate and send a service request with the token through tunnel 310. Proxy services agent 110 verifies the token and can service the request. FIG. 4 depicts a more detailed example of proxy services agent 110. As described above, a service request may be received through a side channel from client device 104. Proxy services agent 110 responds to the service request and may maintain a record of all requests received from client device 104, which may be used in auditing of requests. For example, the audit trail is forwarded to desktop management server 102 for storage. In an embodiment, integration with industry accepted DLP (data leak prevention) products is provided. For example, every time a service request is handled audit logs are propagated to desktop management server 102. Because audit logs are kept, particular embodiments may comply with certain regulations that regulate the publishing of data. Additionally, a centralized copy of information (e.g., files) is kept in the data center. This may comply with company regulations. Also, edits made on client device 104 may be synchronized with the central copy.

Depending on the service request, proxy services agent 110 may leverage different service plug-ins 112. For example, a file explorer service agent 112-1, a search service agent 112-2, and a browser service agent 112-3 may be used to process different service requests. Other services may also be added as plug-ins and existing plug-ins may be removed. File explorer service agent 112-1 may perform requests associated with the files stored on or accessible to remote desktop 106. Search service agent 112-2 may perform searches of the local desktop at remote desktop 106. Browser service agent 112-3 may be a proxy for web browsing requests. For example, access to an intranet or the Internet is provided via browser service agent 112-3.

Proxy services agent 110 receives service requests and performs the requested services, optionally by performing system calls into the operating system running on remote desktop 106. For example, files may be retrieved by accessing system functions of the operating system on remote desktop 106. Also, applications running on remote desktop 106 may also be queried to perform the services. A result set gathered by proxy service agent 110 and then returned to client device 104. The type of result set may depend on the service performed. For example, proxy services agent 110 may use file explorer service agent 112-1 to output a list of files. Browser service agent 112-3 may output a web page and search service agent 112-2 may output search results of the local desktop. The service may be performed without invoking a corresponding application on remote desktop 106. For example, if a web page is opened, a web browser on remote desktop 106 will generally not be launched to open the web page. Rather, a query is performed to determine the requested web page via APIs of the operating system to access the web page. The result set may include HyperText Transfer Markup Language (HTML) for the web page.

Once the service has been performed by remote desktop 106, the result set is prepared for transmission to client device 104. A data transmitter 402 may optimize the result set based on the type of data being sent. For example, some data may be compressed and/or encrypted before sending. In one example, HTTP data from a web page may be compressed or files may be compressed and encrypted. The encryption may be secure socket layer (SSL) or other known encryption techniques. If the result set includes a file to send to client device 104, a hypertext transfer protocol (HTTP) chunked session is initiated and the file is divided into small binary chunks for transfer. Chunked transfer encoding is a data transfer scheme available in the HTTP WAN protocol and is leveraged to maintain a live connection to client device 104 to send variable sized chunks.

In a search example, search service agent 112-2 is used to performed searches of remote desktop 106 that might not be possible on client device 104. For example, a local email client on remote desktop 106 may be searched. The local email client may have access to an indexed version of the user's email on an email server. A user may enter a search query on client device 104 and the query is sent to proxy services agent 110. Search service agent 112-2 is used to perform the query. A result set is determined of emails that match the query based on a search of the indexed version of the user's email. Searching the indexed version is an efficient way to search through a user's email. The result set may then be sent back to client device 104. A native email application may then be used to display emails selected from the result set.

In a browser example, browser services agent 112-3 is used to perform web browsing of an internal enterprise intranet or the public Internet. Browsing of web pages may be more efficiently performed using remote desktop 106. For example, the bandwidth of a connection to the Internet in the data center may be faster than the bandwidth of a connection available to client device 104. In one example, a user may enter a uniform resource locater (URL) for a web page. The query is then sent to proxy services agent 110. Browser service agent 112-3 may access the web page using remote desktop 106. For example, the HTML of the web page is retrieved using APIs of the web browser on remote desktop 106. The web page is sent to client device 104, which launches a native web browser to display the web page. For example, the native web browser uses the HTML to display the web page. One way the browsing may be optimized is that the HTML for the web page may be compressed and sent to client device 104, which uses less bandwidth. Another way of optimization is link retrieval may be performed when the web page is retrieved. Link retrieval optimistically retrieves and caches web pages associated with the links on the web page sent to client device 104. Because bandwidth in the data center is usually faster, the web pages may be retrieved efficiently and stored at remote desktop 106. If a link is then selected by a user, then the newly selected page may be immediately sent to client device 104 without performing another web query.

Figure 5:
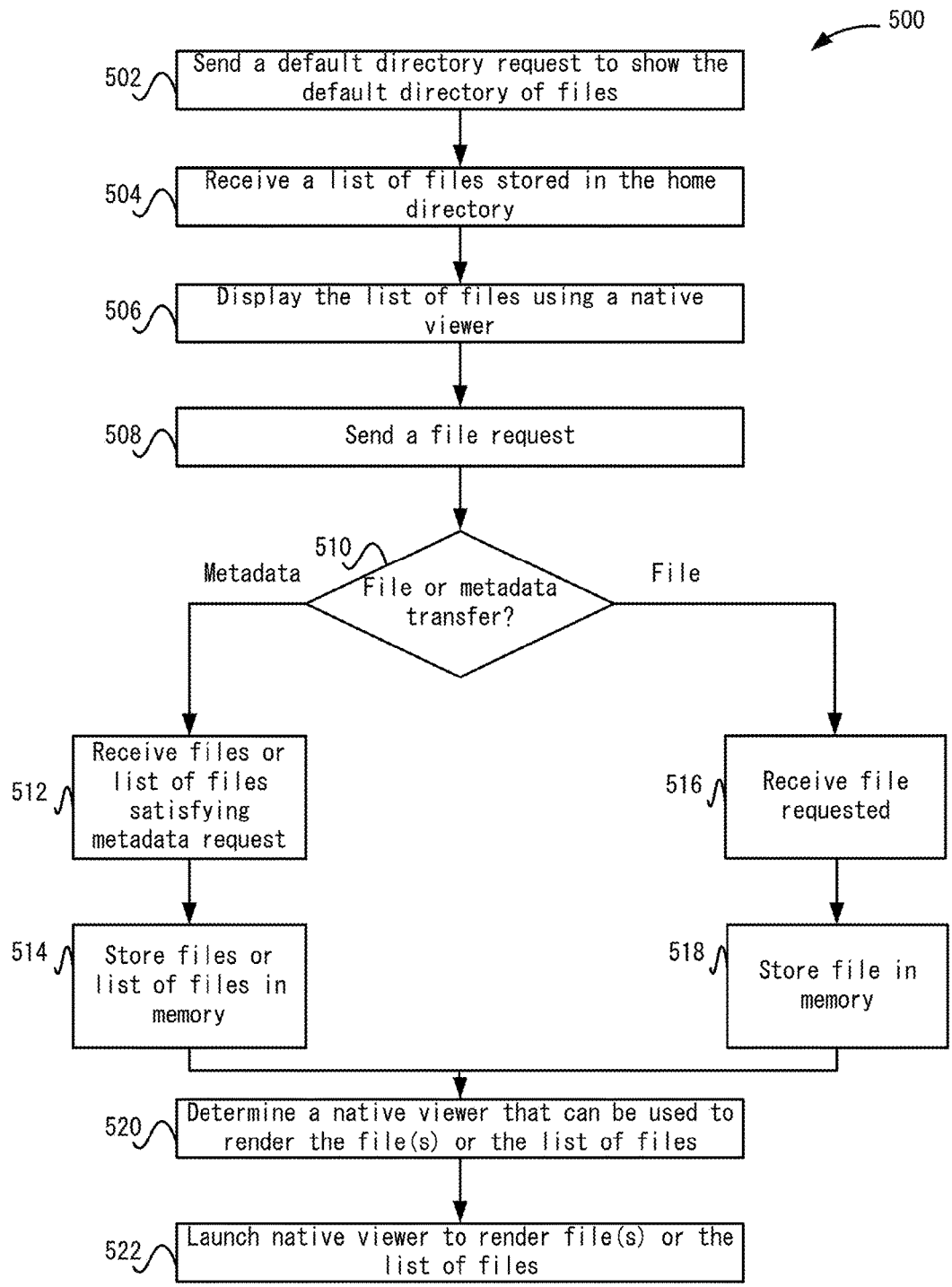
FIG. 5 depicts a simplified flowchart of a method for processing file service requests.
Figure 6:
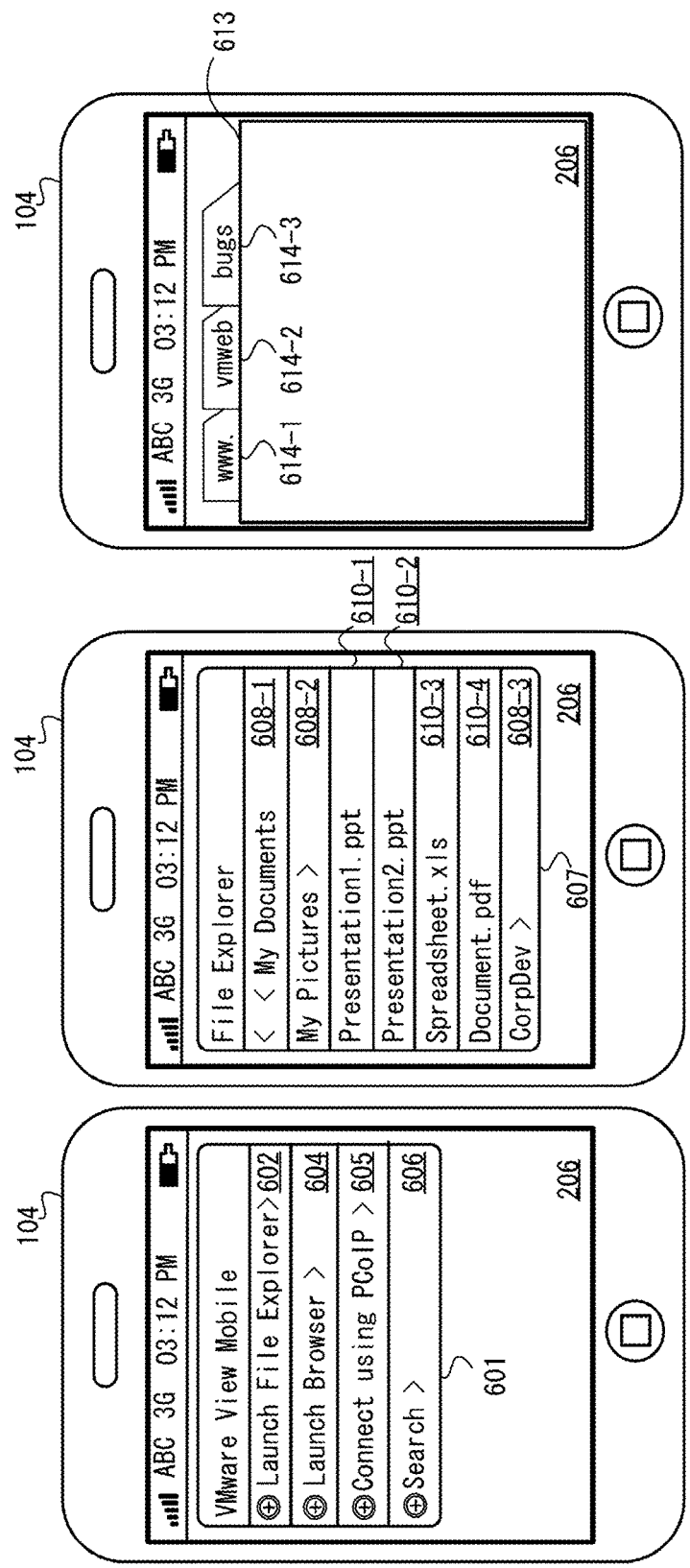
FIG. 6a shows a first view of a native file explorer application for file viewing.
FIG. 6b shows a second view of a native file explorer application for file viewing.
FIG. 6c shows a third view of a native web browsing application for web content viewing.

In a file explorer example, a file system may be accessed using remote desktop 106. FIG. 5 depicts a simplified flowchart 500 of a method for processing file service requests according to an embodiment. In one example, a special handler/service is provided by file explorer service agent 112-1 to handle incoming file service requests. File explorer service agent 112-1 may be a micro HTTP protocol handler on a configurable port that provides HTTP file explorer remoting application programmer interfaces (APIs) for mobile devices. In one example, a connection is opened on a file handler port on client device 104 to have file service requests performed using the APIs.

At 502, client device 104 sends a default directory request to show the default directory (e.g., a home directory) of files. The default directory may also be configurable by each user or an administrator. At 504, client 104 receives a list of files stored in the home directory. For example, file explorer service agent 112-1 may send a request to remote desktop 106 to retrieve the list of files in the home directory. The "list of files" may include file names and/or folder names for files and folders in the directory. The list of files is returned as the result set to client 104.

At 506, client device 104 displays the list of files using native viewer 206. For example, the native file viewer application on client device 104 may be used to display the list of files. The user may then review the file list, navigate to other folders using additional directory requests, and perform a file request. At 508, client 104 generates and sends the file request. Different file requests may be sent, such as a metadata request or a file transfer request. File transfer requests are requests for file contents and metadata requests return information describing data about files that are stored at remote desktop 106. Examples of metadata requests include requests such as "GetAllFiles" for a default folder (e.g., a "My Documents" folder in Windows), which retrieves a list of files stored in the folder. Additional requests may also be supported, such as "recentlyUsedFiles", "searchFilesInAFolder", and "emailFiles". These requests retrieve recently used files, search for files in a folder, or email certain files.

At 510, it is determined whether the request is for a file transfer or a metadata transfer. If the request is a metadata request, at 512, client device 104 receives requested file information or list of files. At 514, the file information or list of files is stored in memory 204. If the request is a file transfer request, at 516, client 104 receives at least a portion of the contents of the file or files requested. For example, the file contents may be sent in chunks or pages. At 518, the file contents are stored in memory 204. The result set for either type of request may also contain metadata information about the files retrieved, such as "isFileAFolder", "lastModified Timestamp", "fileSize", and "fileACL" metadata. The "isFileAFolder" metadata indicates whether the file is a folder, the "lastModified Timestamp" metadata indicates the time when the file was last modified, the "fileSize" metadata indicates the size of the file, and the "fileACL" metadata indicates the access rights to the file.

Whether the request was a metadata request or a file transfer request, at 520, native viewer selector 208 determines a native viewer 206 that can be used to render the requested information pertaining to the file(s) or list of files or contents. At 522, native viewer launcher 210 launches native viewer 206 to render the file(s) or list of files. FIG. 6a shows a first view 601 of a native file explorer application for file viewing. A native file explorer application may be used to display the list of file names. In a first view 601, an initial client services interface is shown. View 601 includes a "Launch File Explorer" option 602, a "Launch Browser" option 604, a "Connect using PCoIP" option 605, and a "Search" option 606. Launch file explorer option 602 allows a user to perform file service requests. Launch browser option 604 allows a user to perform browser retrieval of web content. Connect using PCoIP option 605 allows the user to connect to a standard remote desktop protocol session. This is where a bitmap of the user's remote desktop 106 is displayed at client 104. Search option 606 allows local searches of remote desktop 106.

FIG. 6b shows a second view 607 of a native file explorer application for file viewing. In second view 607, Launch File Explorer option 602 has been selected and a new view is displayed. Second view 607 may be generated as a native view so the experience is similar to accessing a local file system on client device 104. That is, native viewer 206 is the same viewer that is used to access files that are stored locally on client device 104. View 607 may display a default directory (or another directory that is requested by the user). In this case, client device 104 generates a service request to remote desktop 106 for the default directory. File explorer service agent 112-3 services the request and returns metadata with a list of folders and/or files in the directory. For example, the default directory includes folders 608-1-608-3 of "MyDocuments", "MyPictures", and "CorpDev". Additionally, files 610-1-610-4 are of different types (e.g., .ppt, .xls, and .pdf).

When a file or folder is selected by the user, e.g., by tapping it, the file may be downloaded to memory 204 and native viewer 206 may be launched to render the file contents or list of files. In one example of a metadata request, the "MyPictures" folder 608-2 may be selected. A metadata request for the list of files in the "MyPictures" folder 608-2 may then be generated and sent to remote desktop 106. File explorer service agent 112-1 then processes the request to determine the list of files in the "MyPictures" folder on the user's remote desktop 106. The list of files is sent to client device 104 and rendered in native viewer 206. For example, the list is shown using the local file explorer application, which leverages the form factor of client device 104. Also, in an example of a file transfer request, a selection from user is received for one of files 610, such as the "GartnerHype.pdf" file 610-4. The request for the file is generated and sent to remote desktop 106. File explorer service agent 112-1 processes the request to have remote desktop 106 retrieve the file. The file is processed by data transmitter 402 for optimal transmission and then sent to client device 104. Client device 104 receives the content and result set receiver 202 performs any pre-processing of data such as decryption/decompression. Client device 104 then determines that the type of the file is a PDF file and invokes the native PDF viewer. The native PDF viewer then displays the "Document.pdf" file 610-4. In one example, the native PDF viewer may be a different application (e.g., from a different vendor) than the PDF viewer on remote desktop 106. There may be no restriction as to the application used to view the result set on client device 104.

FIG. 6c shows a third view 613 of a native web browsing application for web content viewing. For example, the Internet or private enterprise intranet sites may be accessed using browser service agent 112-3. Tabs 614-1, 614-2, 614-3 are standard browser tabs that allow the user to switch between multiple open browser windows. Using a tab 614-1, for example, an Internet web browser may be selected to perform searches. Tab 614-2, may show a private enterprise intranet web page and tab 614-3 may show yet another private intranet web page, e.g., a bug listing. In one example, tab 614-2 may be selected and a native web browser may be displayed. A search query is received from the user and a search request is sent to remote desktop 106. Browser service agent 112-3 proxies the request to remote desktop 106 to have the search request performed. For example, a webpage may be retrieved from the intranet. When the webpage is sent to client device 104, the web page can be optimized for enhanced transmission by data transmitter 402 and rendered by the native web browser.

Accordingly, particular embodiments use native viewer 206 to display result sets from service requests. Using native viewer 206 leverages the form factor and ergonomics of client device 104. For example, if client device 104 has a small mobile phone form factor, a complete Windows® desktop folder view may not be intuitive for the user. Additionally, converting touch events to mouse/keyboard events may not work correctly on mobile phones with small screen resolutions. Using native viewer 206 allows those touch events to be used without translation to mouse/keyboard events. Additionally, the features of native viewers 206 may now be leveraged. For example, features such as zoom in, pan, and rotate on locally-rendered native viewers 206 for different file formats may be leveraged.

While file viewing has been described, file editing is also possible where the changes may be pushed back to remote desktop 106. In this case, changes may be sent back to remote desktop 106. The edits may be stored in the files at remote desktop 106. Different techniques may be used to store the changes, such as a binary "diff" of files to push back only changes in a file.

Figure 7:
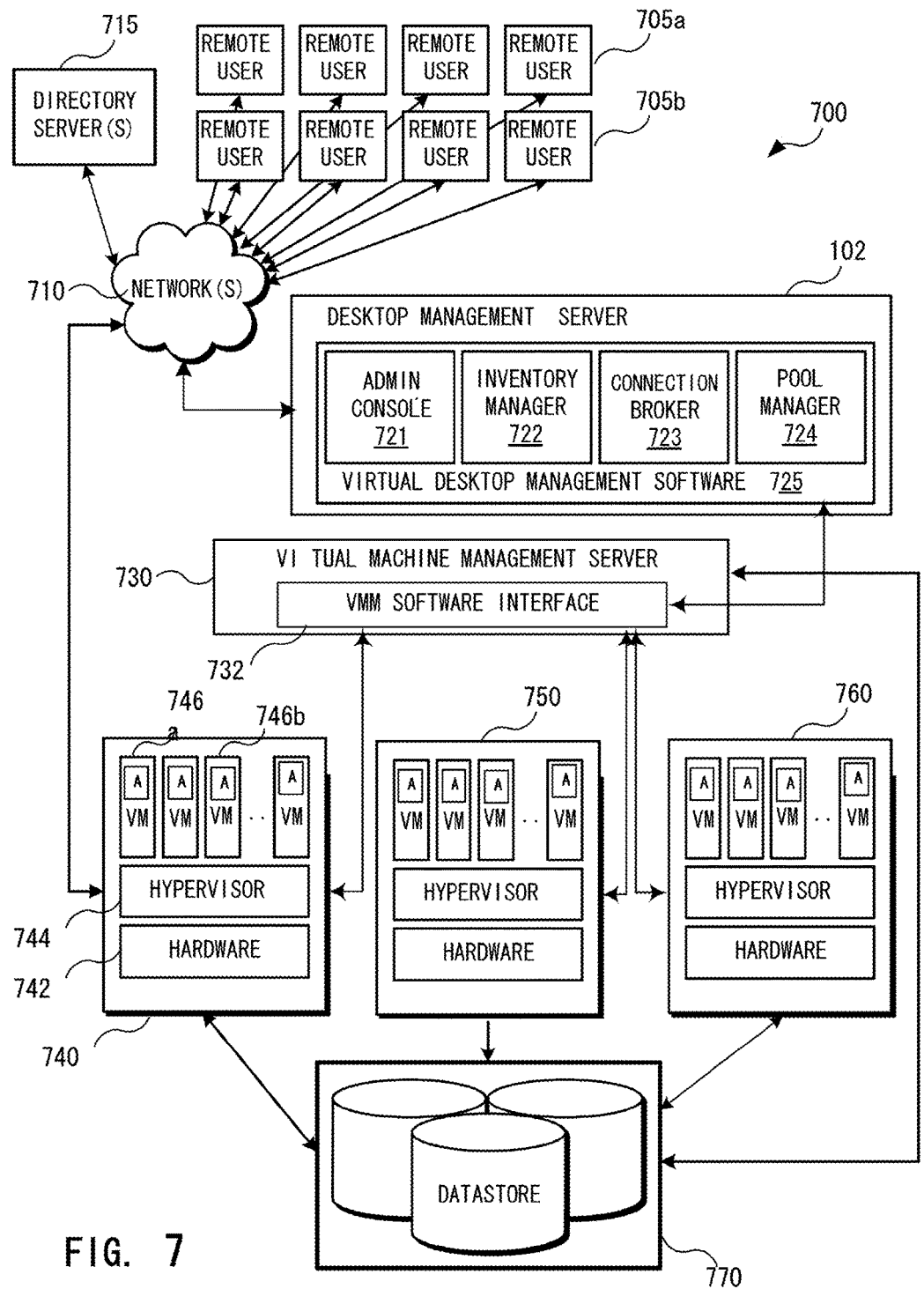
FIG. 7 is a block diagram of an example general virtualized machine architecture environment for executing example embodiments.

FIG. 7 is a block diagram of an example general virtual desktop infrastructure (VDI) environment for executing example embodiments. The following architecture may be used in a remote desktop session and may be enhanced to use the client services interface to have services performed and return result sets for display using native viewers 206. As shown in FIG. 7, in traditional use, remote users, for example users 705a and 705b, may access centrally-managed remote desktops 106, such as those implemented by virtual machines 746 running in a datacenter, using network 710 (e.g., a local area network, or other private or publically accessible wide area network, such as the Internet) through any number of different types of devices. These virtual machines (VMs) 746 are complete computation environments, containing virtual equivalents of the hardware and system software components of a physical system as described above, and are typically implemented by an extensive virtualization infrastructure, which includes a variety of software and hardware components.

Remote access to remote desktops is generally provided to client devices through a desktop management server 102. Desktop management server 102 provides access to remote desktops by the remote user devices, and manages the corresponding virtual machines through communications with a software interface 732 of a Virtual Machine Management Server (VMMS) 730. The Virtual Machine Management Server (VMMS) 730 is responsible for provisioning and maintaining the multitude of Virtual Machines (VMs) 746 implemented across potentially a multitude of physical computers, such as computers 740, 750, and 760. When a user wishes to access an existing virtual machine, the user establishes a connection through the desktop management server 102, and a remote desktop is presented (as a user interface) on the user's client device, through which communications are made with the underlying virtual machine. Additionally, the virtual machine may include a proxy services agent 110 as described above with reference to FIGS. 1 and 4 to perform service requests.

In the example embodiment shown, each physical computer, for example computer 740 contains the underlying hardware 742, virtualization software (here a hypervisor 744), and one or more virtual machines, for example VM 746a and VM 746b, which each contain Agent Software (guest system software) labeled here as "A" in each VM box. The Agent Software is typically responsible for connecting each VM to the desktop management server 102 and manages each desktop connection. It typically notifies the desktop management server 102 upon each login, logoff, and disconnect. The Agent Software also provides support for remote devices such as USB devices, etc. The Agent Software may also be enhanced to include proxy services agent 110 and service plug-ins 112.

The VMMS 730 typically manages pools of compute resources used to run virtual machines on a set of clusters typically containing multiple servers with CPUs, memory, and communications hardware (network). A virtual computer (a virtual machine or VM), when active, consumes physical compute resources and is managed by a hypervisor layer, such as hypervisor 744 running on physical computer 740. The hypervisor manages physical resources as well as maintains virtual-to-physical hardware mappings. The Software Interface 732 running on the VMMS 730 communicates with these hypervisors (e.g., hypervisor 744) to provision and manage each VM 746. For example, according to traditional virtualization techniques, when a remote user (e.g., user 705a) requests access to a particular existing desktop, the desktop management server 102 (through its software 725), communicates with the VMMS through its software interface 732 to start the corresponding VM 746 executing on an appropriate physical computer, and to relay the user interface exported by the VM 746 to the remote user so that the user can interact with the remote desktop. In some instances (e.g., according to administrator policies), when the desktop is exited, or otherwise shutdown, the desktop management server 102 communicates with the VMMS 730 to save the VM image to the datastore 770 as appropriate and to de-allocate physical and VM system resources as needed.

In general, the VMMS Server 730 provides interfaces 732 to enable other programs, such as the Pool Manager 724, to control the lifecycle of the various virtual machines that run on a hypervisor. In one example embodiment of an existing virtualization infrastructure provided by VMware Inc., desktop management server 102 includes an Administrative Console 721, an Inventory Manager 722, a Connection Broker 723, and a Pool Manager 724. The Connection Broker 723 allows a remote user, such as remote user 705*a*, through client device 104, to initiate a desktop session with an assigned VM 746 or to access an existing connection to VM 746. Connection Broker 723 may also be enhanced to include remote desktop gateway 302.

The Inventory Manager 722 maintains a mapping of different user belongings in the system. For example, user may be entitled to certain applications; may have access to more than one desktop, etc. The Inventory Manager 722 also keeps track of the running remote desktops in the system. The mappings may be stored using any number of mechanisms, including using one or more directory servers 715 accessible through network 710.

The Pool Manager 724 component manages the complete lifecycle of remote desktops. Desktops in a pool are grouped together based on similar software requirements. Desktop Administrators create logical desktops groups (desktop pools) that are provisioned typically from the same base image, including the Agent Software. For example, a desktop pool may include virtual machines that run the same set of software applications and run the same operating system. As yet another example, a desktop pool may contain a set of cloned virtual machines that are identical in every aspect but are customized to include unique identity that includes for example, a unique computer name, IP/MAC Address, Domain membership, Software license serial numbers, OS specific security identifiers among other things. The base image can be a virtual machine or a template virtual machine that is created and/or managed by the VMMS 730.

The software state of all the virtual machines 746 in a desktop pool may be persistent or non-persistent. Persistent desktops maintain the state of the files or applications stored inside the virtual machines. Non-Persistent desktops are stateless desktops; the desktop state is restored to the original state after every user session. In some cases, the Desktop Administrator can define how frequently the "revert to golden state" operation should be performed. The restore to pristine image or revert to golden state operation can also be scheduled to occur based on certain conditions.

The Administrative Console 721 typically provides a user interface for a Desktop Administrator to manage the configuration of desktop pools, define user access policies, manage ongoing maintenance, software installed in the desktops, etc.

The Directory Server 715 stores the persistent state required for managing the remote desktops. For example, the VMs in a desktop pool maybe associated with one or more users. The user identifiers for a pool may be stored in the directory server 715. The users may also be referenced through an external directory server such as—MICROSOFT® Active Directory, NOVELL eDirectory, IBM Tivoli Directory Server, etc.

The illustrated virtualization architecture is shown using a hypervisor-centric model. Alternative embodiments may control some or all of the VMs 746 in a virtualization architecture that uses containers instead of hypervisors. Yet, other embodiments may manage the depicted VM environment with unikernels. Thus, the illustrated virtualization architecture is but only one configuration for implementing the various embodiments disclosed herein.

Embodiments are not limited to being executed in virtualized environments, however. The disclosed embodiments may be run simply between desktop, server, and client mobile devices in a public or private network environment.

In some examples, executable instructions are stored in a memory. Memory is any device allowing information, such as executable instructions and/or other data, to be stored and retrieved. For example, memory may include one or more random access memory (RAM) modules, flash memory modules, hard disks, solid state disks, and/or optical disks.

Figure 17:
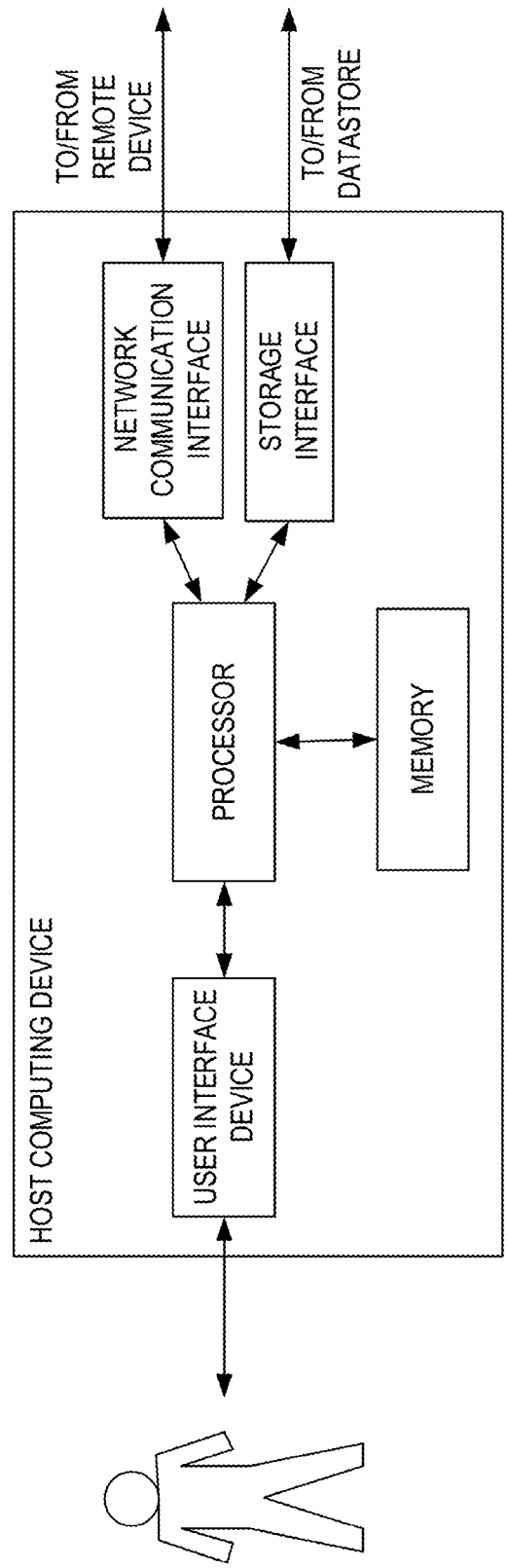
FIG. 17 is an example block diagram of a host computing device.

Another example of a host computing device is illustrated in FIG. 17. A host computing device may include a user interface device for receiving data from a user and/or for presenting data to user. User may interact indirectly with host computing device via another computing device such as a device running VMware's vCenter Server or other management device. User interface device may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device operates to receive data from user, while another device (e.g., a presentation device) operates to present data to user. In other examples, user interface device has a single component, such as a touch screen, that functions to both output data to user and receive data from user. In such examples, user interface device operates as a presentation device for presenting information to user. In such examples, user interface device represents any component capable of conveying information to user. For example, user interface device may include, without limitation, a display device (e.g., a liquid crystal display (LCD), organic light emitting diode (OLED) display, or "electronic ink" display) and/or an audio output device (e.g., a speaker or headphones). In some examples, user interface device includes an output adapter, such as a video adapter and/or an audio adapter. An output adapter is operatively coupled to processor and configured to be operatively coupled to an output device, such as a display device or an audio output device.

Host computing device also includes a network communication interface, which enables host computing device to communicate with a remote device (e.g., another computing device) via a communication medium, such as a wired or wireless packet network. For example, host computing device may transmit and/or receive data via network communication interface. User interface device and/or network communication interface may be referred to collectively as an input interface and may be configured to receive information from user.

Host computing device further includes a storage interface that enables host computing device to communicate with one or more storage devices, which store virtual disk images, software applications, and/or any other data suitable for use with the methods described herein. In example examples, storage interface couples host computing device to a storage area network (SAN) (e.g., a Fibre Channel network) and/or to a network-attached storage (NAS) system (e.g., via a packet network). The storage interface may be integrated with network communication interface.

Virtual machines may be instantiated on host computing device. Host computing device includes a hardware platform, such as an x86 architecture platform. Hardware platform may include processor, memory, network communication interface, user interface device, and other input/output (I/O) devices, such as a presentation device. A virtualization software layer, also referred to hereinafter as a hypervisor, is installed on top of hardware platform.

The virtualization software layer supports a virtual machine execution space within which multiple virtual machines (VMs) may be concurrently instantiated and executed. Hypervisor includes a device driver layer, and maps physical resources of hardware platform (e.g., processor, memory, network communication interface, and/or user interface device) to "virtual" resources of each of VMs such that each of VMs has its own virtual hardware platform (e.g., a corresponding one of virtual hardware platforms), each virtual hardware platform having its own emulated hardware (such as a processor, a memory, a network communication interface, a user interface device and other emulated I/O devices in VM). Hypervisor may manage (e.g., monitor, initiate, and/or terminate) execution of VMs according to policies associated with hypervisor, such as a policy specifying that VMs are to be automatically restarted upon unexpected termination and/or upon initialization of hypervisor. In addition, or alternatively, hypervisor may manage execution VMs based on requests received from a device other than host computing device. For example, hypervisor may receive an execution instruction specifying the initiation of execution of first VM from a management device via network communication interface and execute the execution instruction to initiate execution of first VM.

In some examples, memory in first virtual hardware platform includes a virtual disk that is associated with or "mapped to" one or more virtual disk images stored on a disk (e.g., a hard disk or solid state disk) of host computing device. The virtual disk image represents a file system (e.g., a hierarchy of directories and files) used by first VM in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer includes, for example, a communication interface driver 1020 that interacts with network communication interface to receive and transmit data from, for example, a local area network (LAN) connected to host computing device. Communication interface driver also includes a virtual bridge that simulates the broadcasting of data packets in a physical network received from one communication interface (e.g., network communication interface) to other communication interfaces (e.g., the virtual communication interfaces of VMs). Each virtual communication interface for each VM, such as network communication interface for first VM, may be assigned a unique virtual Media Access Control (MAC) address that enables virtual bridge to simulate the forwarding of incoming data packets from network communication interface. In an example, network communication interface is an Ethernet adapter that is configured in "promiscuous mode" such that all Ethernet packets that it receives (rather than just Ethernet packets addressed to its own physical MAC address) are passed to virtual bridge, which, in turn, is able to further forward the Ethernet packets to VMs. This configuration enables an Ethernet packet that has a virtual MAC address as its destination address to properly reach the VM in host computing device with a virtual communication interface that corresponds to such virtual MAC address.

Virtual hardware platform may function as an equivalent of a standard x86 hardware architecture such that any x86-compatible desktop operating system (e.g., MICROSOFT WINDOWS® brand operating system, LINUX brand operating system, SOLARIS brand operating system, NETWARE, or FREEBSD) may be installed as guest operating system (OS) in order to execute applications 1070 for an instantiated VM, such as first VM. Virtual hardware platforms may be considered to be part of virtual machine monitors (VMM) that implement virtual system support to coordinate operations between hypervisor and corresponding VMs. Those with ordinary skill in the art will recognize that the various terms, layers, and categorizations used to describe the virtualization components may be referred to differently without departing from their functionality or the spirit or scope of the disclosure. For example, virtual hardware platforms may also be considered to be separate from VMMs, and VMMs may be considered to be separate from hypervisor. One example of hypervisor that may be used in an example of the disclosure is included as a component in VMware's ESX brand software, which is commercially available from VMware, Inc.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

We claim:

1. A method for remotely signing documents on a client device, the method comprising:
   establishing a session to allow the client device to access a desktop to have a document opened on the desktop and mirrored onto the client device, the client device and the desktop being associated with a same user, the client device having touch screen capability without the desktop having touch screen capability;
   polling the desktop for queued mirror commands related to the document opened on the desktop;
   based on the queued mirror commands, retrieving from the desktop the document opened on the desktop;
   opening the retrieved document on the client device;
   receiving, via the touch screen capability on the client device, a user signature on the document; and mirroring a signed version of the document to the desktop for storage thereon.

2. The method of claim 1, wherein opening the retrieved document on the client device comprises launching a native viewer on the client device to view the opened document, the native viewer including features not available on the desktop comprising one or more of the following: zoom-in, pan, and rotate.

3. The method of claim 1, wherein the signed version of the document is automatically sent to the user as an e-mail attachment.

4. The method of claim 1, further comprising:
transmitting the signed version of the document from the client device to the desktop; and
generating a template message on the desktop with the signed version of the document attached.

5. The method of claim 4, further comprising transmitting a template message with the signed version of the document attached from the desktop to a recipient messaging address without user interaction.

6. The method of claim 1, wherein the client device is a mobile tablet or a smart phone.

7. The method of claim 1, wherein the client device is a smart watch or a wearable device.

8. The method of claim 1, further comprising:
presenting on the client device one or more options for generating template messages on the desktop that include the signed version of the document;
receiving a user selection of one of the one or more options; and
signaling the desktop to send a message with the signed version of the document attached using the selected template.

9. Computer-storage memory embodied with instruction executable by a processor to enable remote signature of documents on a client device, comprising:
causing the client device to poll a desktop for one or more mirror commands instructive to cause a document opened on the desktop to be mirrored on the client device, the client device and the desktop being associated with a same user, the client device having touch screen capability without the desktop having touch screen capability;
capturing a user signature on the client device, via the touch screen capability on the client device;
creating a signed version of the mirrored document that includes the captured user signature; and
transmitting the signed version of the mirrored document to the desktop.

10. The computer-storage memory of claim 9, further comprising:
queuing on the desktop one or more locations of the document opened on the desktop;
directing the client device to poll the desktop for the one or more locations of the document;
receiving the one or more locations of the document opened on the desktop; and
using the one or more locations to mirror the document onto the client device.

11. The computer-storage memory of claim 9, further comprising:
transmitting the signed version of the mirrored document to the desktop; and
causing the desktop to store the signed version of the mirrored document at the one or more locations of the document.

12. The computer-storage memory of claim 10, wherein the client device automatically communicates the signed version of the mirrored document to the desktop upon user signature.

13. The computer-storage memory of claim 10, further comprising generating a template message on the desktop with the signed version of the document attached.

14. The computer-storage memory of claim 10, further comprising transmitting a template message with the signed version of the document attached from the desktop to a recipient messaging address without user interaction.

15. The computer-storage memory of claim 10, wherein the client device is at least one member of a mobile tablet, a smart phone, a smart watch, and a wearable device.

16. The computer-storage memory of claim 10, further comprising:
presenting on the client device one or more options for generating template messages on the desktop that include the signed version of the mirrored document;
receiving on the client device a user selection of one of the one or more options; and
signaling the desktop to send a message with the signed version of the document attached according to the user selection.

17. A client device, comprising:
computer-storage memory embodied with computer-executable instructions for mirroring a document opened on a desktop;
a display device; and
a processor programmed to:
poll the desktop for mirroring commands instructive for causing the document opened on the desktop to be mirrored on the display device, the client device and the desktop being associated with a same user, the client device having touch screen capability without the desktop having touch screen capability;
capture a user signature on the display device, via the touch screen capability on the client device;
create a signed version of the mirrored document that includes the captured user signature; and
transmit the signed version of the mirrored document to the desktop.

18. The client device of claim 17, wherein the client device comprises at least one member of a group comprising a mobile tablet, a smart phone, a smart watch, and a wearable device.

19. The client device of claim 17, wherein the mirroring commands comprise one or more locations corresponding to the document opened on the desktop.

20. The client device of claim 17, wherein the desktop is configured to:
receive the signed version of the mirrored document;
generate a template message with the signed version of the mirrored document; and
transmit the template message with the signed version of the mirrored document.

* * * * *